(12) United States Patent
Wensley et al.

(10) Patent No.: US 6,936,377 B2
(45) Date of Patent: Aug. 30, 2005

(54) CARD WITH EMBEDDED IC AND ELECTROCHEMICAL CELL

(76) Inventors: C. Glen Wensley, 5635 Summerland Hills Cir., Lakeland, FL (US) 33813; Scott Gustafson, 4105 Sunny Glenn Dr., Lakeland, FL (US) 33813; Craig R. Nelson, 735 Glengary Dr., Melbourne, FL (US) 32940

(*) Notice: Subject to any disclaimer, the term of this patent is extended or adjusted under 35 U.S.C. 154(b) by 48 days.

(21) Appl. No.: 10/437,546

(22) Filed: May 13, 2003

(65) Prior Publication Data

US 2004/0229118 A1 Nov. 18, 2004

(51) Int. Cl.[7] .................. H01M 10/40; H01L 23/02
(52) U.S. Cl. ............... 429/162; 257/679; 257/924; 429/122; 429/306; 235/380; 235/492
(58) Field of Search ................. 429/162, 122, 429/306; 235/380, 492; 257/679, 924

(56) References Cited

U.S. PATENT DOCUMENTS

| | | | |
|---|---|---|---|
| 5,019,467 A | | 5/1991 | Fujiwara |
| 5,056,145 A | * | 10/1991 | Yamamoto et al. ......... 704/270 |
| 5,677,568 A | | 10/1997 | Ochi et al. |
| 5,735,040 A | * | 4/1998 | Ochi et al. ................. 29/841 |
| 5,888,672 A | | 3/1999 | Gustafson et al. |
| 6,109,530 A | | 8/2000 | Larson |
| 6,148,503 A | * | 11/2000 | Delnick et al. ............. 29/623.1 |
| 6,451,480 B1 | | 9/2002 | Gustafson et al. |
| 6,503,831 B2 | | 1/2003 | Speakman |
| 6,713,389 B2 | | 3/2004 | Speakman |
| 2002/0128034 A1 | | 9/2002 | Stratmoen |
| 2002/0153424 A1 | * | 10/2002 | Li ............................. 235/492 |
| 2003/0222755 A1 | | 12/2003 | Kemper |
| 2004/0229127 A1 | | 11/2004 | Wensley |
| 2004/0253520 A1 | | 12/2004 | Wensley |
| 2005/0026042 A1 | | 2/2005 | Vallee |

OTHER PUBLICATIONS

PCT International Search Report from counterpart application, PCT/US04/13010; Nov. 23, 2004; citing four A references listed above; Examiner John Maples.

* cited by examiner

Primary Examiner—John S. Maples
(74) Attorney, Agent, or Firm—Foley & Lardner LLP

(57) ABSTRACT

An IC card includes at least one plastic layer, a battery and at least one electronic device embedded in the plastic layer. The battery is electrically connected to the electronic device for providing power to the device. The battery includes an anode, a cathode, and at least one polymer matrix electrolyte (PME) separator disposed between the anode and the cathode. The PME separator includes a polyimide, at least one lithium salt and at least one solvent all intermixed. The PME is substantially optically clear and stable against high temperature and pressure, such as processing conditions typically used in hot lamination processing or injection molding.

26 Claims, 29 Drawing Sheets poly(PMDA+TMMDA)imide poly(PMDA/6FDA+TMMDA)imide

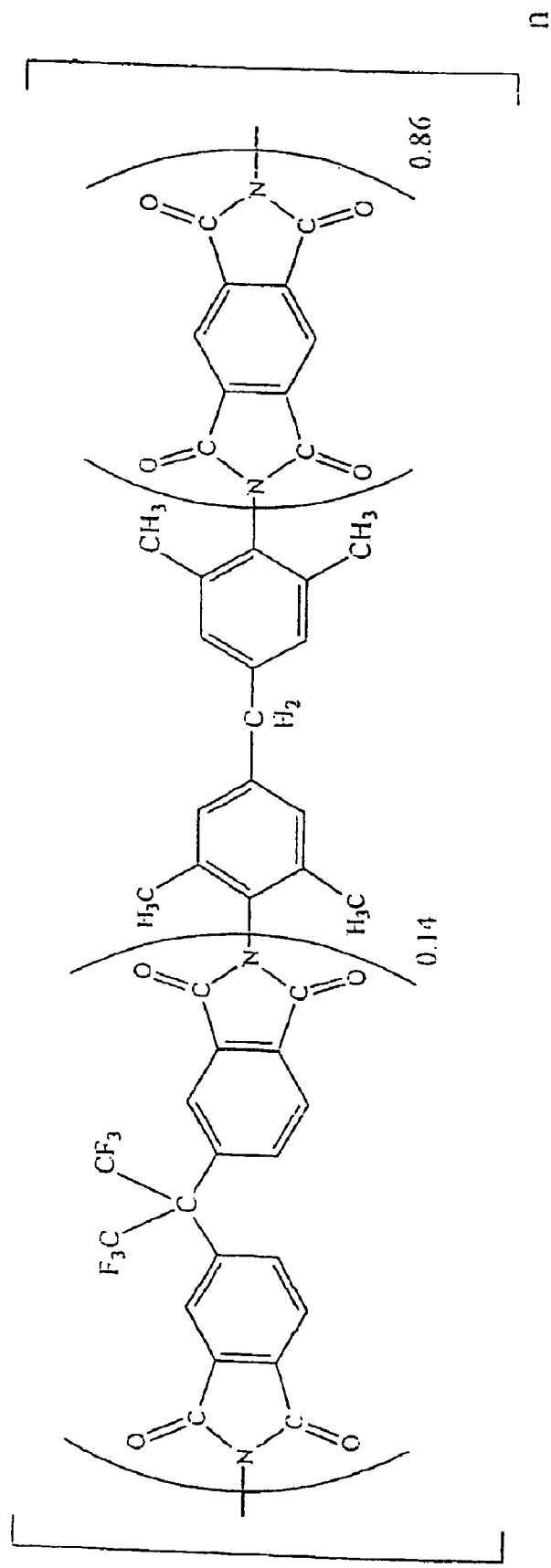
FIG. 1(c) poly(PMDA/6FDA+TMMDA)imide poly(PMDA/PSDA+TMMDA)imide poly(BPDA+durene)imide poly(6FDA+durene)imide poly(PSDA+TMMDA)imide poly(6FDA+TMMDA)imide poly(BPDA + 4,4'-fluorilidenedianiline)

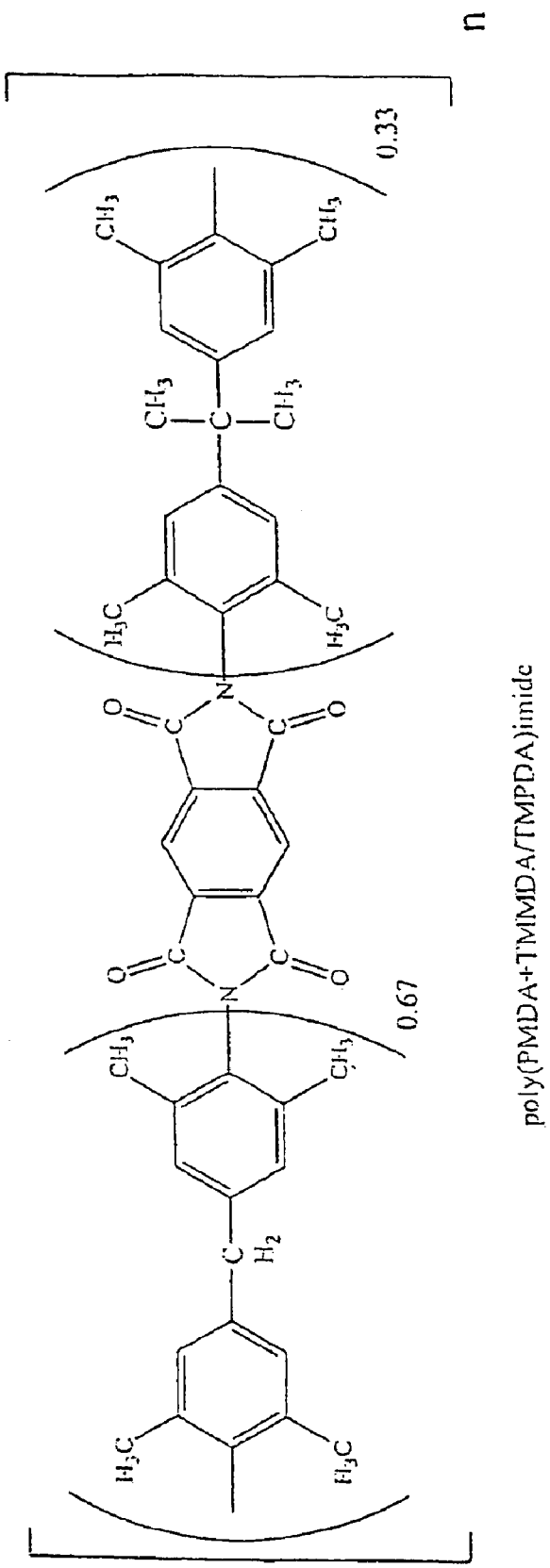
FIG. 1(j)  poly(PMDA+TMMDA/TMPDA)imide

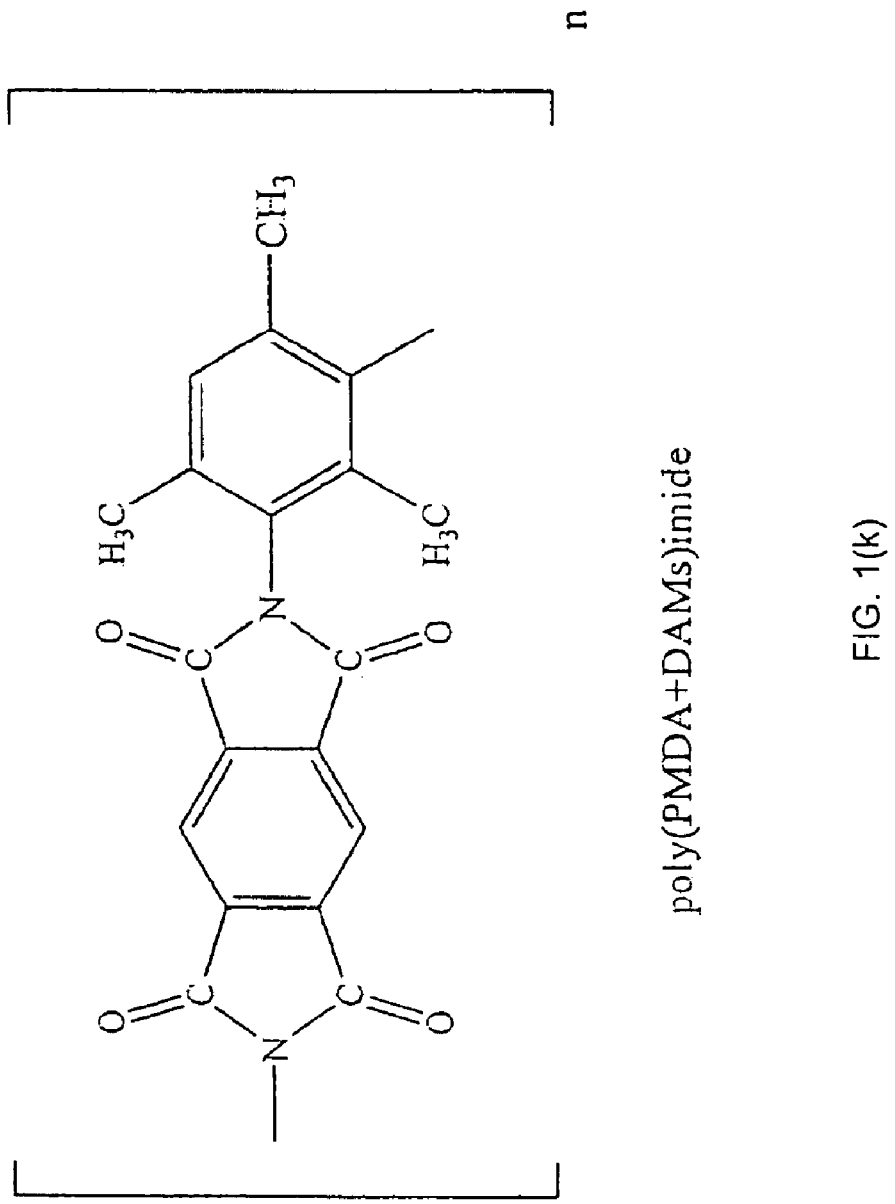
FIG. 1(k) poly(PMDA+DAMs)imide poly(PMDA+4-isopropyl-m-phenylenediamine)imide

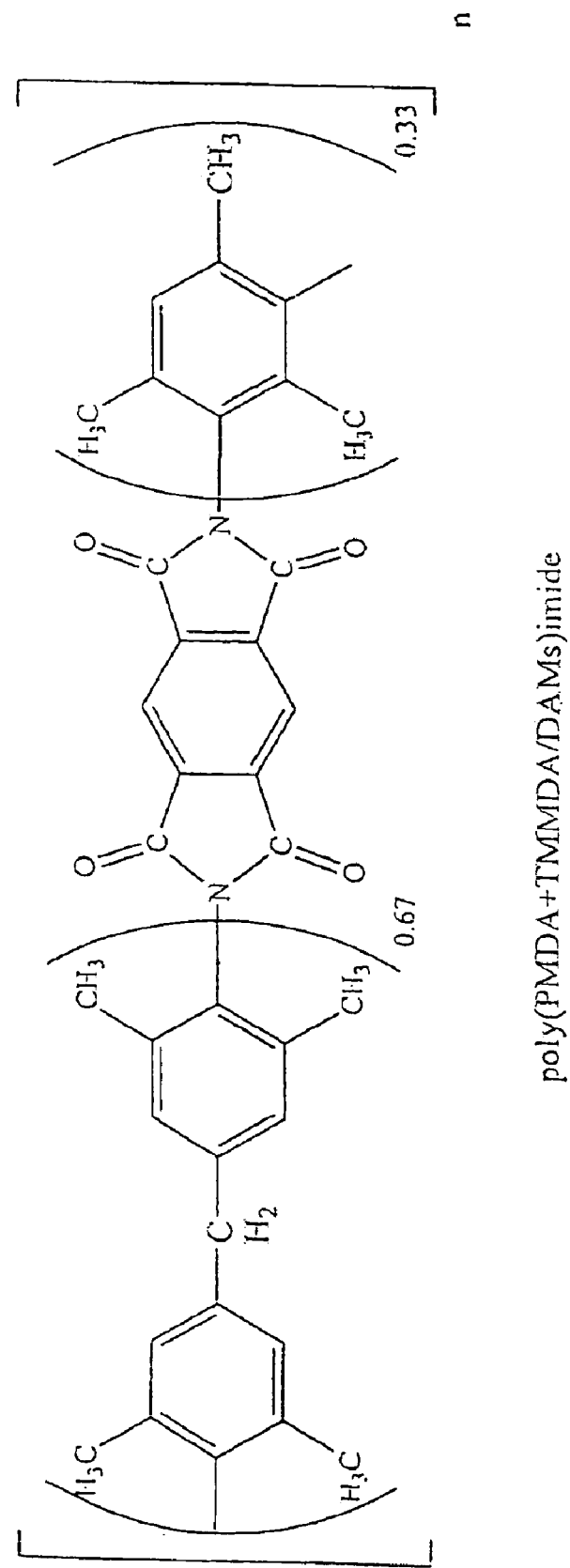
FIG. 1(m) poly(PMDA+TMMDA/DAMs)imide

GPI-15 and LiTFSi with GBL at 20.5C

| Salt Conc. | Max S/cm | LiTFSi/GBL | GBL/PI | Film Composition | | |
|---|---|---|---|---|---|---|
| | | | | Wt % GBL | Wt % PI | Wt % salt |
| 1.0x | 1.8E-04 | 0.581 | 1.72 | 46.2 | 26.9 | 26.9 |
| 1.4x | 1.8E-04 | 0.875 | 1.60 | 40.0 | 25.0 | 35.0 |
| 1.8x | 2.5E-04 | 1.040 | 1.73 | 38.2 | 22.1 | 39.7 |
| 2.2x | 4.2E-04 | 1.128 | 1.95 | 37.9 | 19.4 | 42.7 |

| | if S/cm | LiTFSi/GBL | GBL/PI | Film Composition | | |
|---|---|---|---|---|---|---|
| | | | | Wt % GBL | Wt % PI | Wt % salt |
| 1.0x | 1.0E-04 | 0.952 | 1.05 | 34.4 | 32.8 | 32.8 |
| 1.4x | 1.0E-04 | 1.429 | 0.98 | 29.0 | 29.6 | 41.4 |
| 1.8x | 1.0E-04 | 1.800 | 1.00 | 26.3 | 26.3 | 47.4 |
| 2.2x | 1.0E-04 | 2.200 | 1.00 | 23.8 | 23.8 | 52.4 |

FIG. 2

Chem Abstracts numbers for the monomers of interest

| Monomer | CAS # |
|---|---|
| PMD | 89-32-7 |
| TMMDA | 4037-98-7 |
| DAMs | 3102-70-3 |
| 6FDA | 1107-00-2 |
| TEMDA | 13680-35-8 |
| TMPDA | 22657-64-3 |
| BPDA | 2421-28-5 |
| DSDA | 2540-99-0 |
| 4-isopropyl-m-phenylenediamine | 14235-45-1 |
| 3,6-diaminodurene | 3102-87-2 |
| 4,4'-(9-fluorenylidene)dianiline | 15499-84-0 |

FIG. 6

CARD WITH EMBEDDED IC AND ELECTROCHEMICAL CELL

CROSS REFERENCE TO RELATED APPLICATION

Not applicable.

STATEMENT AS TO FEDERALLY SPONSORED RESEARCH

Not applicable.

FIELD OF THE INVENTION

The invention generally a card including an embedded battery internally connected to electronics also embedded in the card.

BACKGROUND

The need for information cards that contain electronics such as integrated circuits (IC) has been increasing as of late. The IC can provide functions, such as for retrieving, processing, transmitting and storing information. Such cards are generally referred to as "smart cards" which have potential application in a wide range of fields, including commerce, transportation, communication, identification, and security.

It is known to incorporate batteries into cards to provide a power source for the electronic circuitry within. Having a battery incorporated into the IC card allows for the storage of greater amounts of data, and further allows for improved processing capabilities.

Because of the difficulty of providing the energy required for most applications within the space constraints of a typical credit card, it is desirable to use battery types which provide the highest energy density. Lithium batteries have been introduced into the market because of their high energy densities. Lithium is atomic number three on the periodic table of elements, having the lightest atomic weight and highest energy density of any solid material. As a result, lithium is a preferred material for batteries, having very high energy density. Lithium batteries are also desirable because they have a high unit cell voltage of up to approximately 4.2 V, as compared to approximately 1.5 V for both Ni—Cd and Ni-MH cells. Lithium batteries can be either lithium ion batteries or lithium metal batteries. Lithium ion batteries intercalate lithium ions in a host material, such as graphite, to form the anode. On the other hand, lithium metal batteries use metallic lithium or lithium alloys for the anode.

Lithium batteries having solid polymer electrolytes represent an evolving alternative to lithium batteries having liquid electrolytes. Solid polymer electrodes are generally gel type electrolytes which trap solvent and salt in pores of the polymer to provide a medium for ionic conduction. Typical polymer electrolytes comprise polyethylene oxide (PEO), polyether based polymers and other polymers which are configured as gels, such as polyacrylonitrile (PAN), polymethylmethacrylate (PMMA) and polyvinylidine fluoride (PVDF). The polymer electrolyte generally functions as a separator, being interposed between the cathode and anode films of the battery.

Lithium metal polymer (LMP) rechargeable batteries offer improved performance as compared to Li ion batteries, particularly higher capacity. LMP batteries result from the lamination/assembly of three types of main thin films: a film of positive electrode comprising a mixture of a polymer and an electrochemically active material such as lithium vanadium oxide, an electrolyte film separator made of a polymer and a lithium salt, and a negative electrode film comprising metallic lithium or a lithium alloy.

Unfortunately, conventional batteries including lithium metal or lithium ion batteries lack the stability to be subjected to credit card processing, which can include a temperature of 125C to 140C, a pressure of 200 to 250 psi, and a dwell time of 5 to 15 minutes. Conventional batteries subjected to the above described card lamination conditions will generally either catastrophically fail or experience a large shift in operating parameters which would render them of no practical use. As a result, although batteries have been disposed inside credit cards, a low temperature glue has been used to bind the battery to the card.

SUMMARY OF THE INVENTION

An IC card includes at least one plastic layer, a battery and at least one electronic comprising device embedded in the plastic layer. The battery is electrically connected to the electronic comprising device for providing power for the electronic comprising device. The battery includes an anode, a cathode, and at least one polymer matrix electrolyte (PME) separator disposed between the anode and the cathode. The PME separator comprising a polyimide, at least one lithium salt and at least one solvent intermixed. The lithium salt is preferably in a concentration of at least 0.5 moles of lithium per mole of imide ring provided by said polyimide. The PME is substantially optically clear.

As used herein, the phrase "substantially optically clear" relative to the PME refers to a material being at least 90% clear (transmissive), preferably at least 95%, and most preferably being at least 99% clear as measured by a standard turbidity measurement for 1 mil normalized thick film at 540 nm. The high level of optical clarity of the PME evidences the homogeneity of the PME comprising its respective components (polyimide, salt and the solvent) as any significant phase separation would reduce optical clarity.

The anode can include lithium ion intercalation material or lithium metal including lithium metal alloys. A repeat unit weight per imide ring of the polyimide can be no more than 350, no more than 300, or no more than 250. The polyimide is soluble at 25 C in at least one solvent selected from the group consisting of N-methylpyrrolidinone (NMP), dimethylacetamide (DMAc) and dimethylformamide (DMF).

The ionic conductivity of the PME at 25° C. is at least $1 \times 10^{-4}$ S/cm, and is preferably at least $3 \times 10^{-4}$ S/cm.

The Li salt can be selected from a variety of salts. For example LiCl, LiBr, LiI, $LiClO_4$, $LiBF_4$, $LiAsF_6$, $LiPF_6$, $LiCF_3SO_3$, LiBOB, $LiN(CF_3SO_2)_2$, and lithium bis (trifluorosulfonyl)imide (LiTFSI) can be used.

The cathode can comprise an ion conducting polymeric binder intermixed with an intercalation material. In this embodiment, the polymeric binder can comprise at least one polyimide, including the same polyimide comprising the PME.

The battery can provide no significant change in open circuit voltage (OCV) or capacity following heating at 125° C. for at least 5 minutes while under a pressure of at least 250 psi. As used herein, the phrase "no significant change in open circuit voltage (OCV) or capacity" following a given heat and/or pressure cycle, refers to a shift in the open circuit voltage and capacity of the battery of no more than 15%, preferably less than 10%, and more preferably less than 5%.

For example, a lithium metal battery having a lithium vanadium oxide comprising cathode was found to provide a shift in OCV of 1.4% and a commensurately small reduction in capacity following a typical credit card lamination process comprising a temperature of 140 C for 15 minutes under a pressure of 220 psi. Moreover, batteries formed using the PME are quite flexible and can exceed ISO standards ISO/IEC 10373 and 14443.

The battery can be a primary battery or secondary battery. The battery is preferably a bicell. The IC card can utilize a package comprising packaging material surrounding said battery to form a packaged battery, the packaging material laminated by an exterior binder adhesive to all exterior surfaces of the battery. In another embodiment, a package including packaging material surrounds the battery and a frame having an opening to accommodate the battery therein is used to form a packaged battery, wherein the battery is disposed within the opening. This embodiment provides highly planar batteries, such as a thickness uniformity throughout within ±1 mil.

The IC card can include an exterior binder adhesive disposed between the packaged battery and the plastic layer to bind said packaged battery to the plastic layer, wherein the exterior binder adhesive is activated at a temperature of at least 100 C. An interior binder adhesive can be use to seal the battery, wherein the interior binder adhesive has an activation temperature which is lower than the activation temperature of the exterior binder adhesive. The IC card can provide a thickness uniformity throughout within ±1 mil. In addition, the IC card can comply with ISO testing criteria for bending, flex, and torsion according to ISO standards ISO/IEC 10373 and 14443 without inducing any visually detectable delamination.

A method of forming a card including embedded electronics includes the steps of providing a battery including an anode, a cathode, and at least one polymer matrix electrolyte (PME) separator disposed between the anode and the cathode. The PME separator comprises a polyimide, at least one lithium salt and at least one solvent intermixed, the PME being substantially optically clear. The battery and at least one electronic comprising device are embedded in at least one plastic layer, the battery being electrically connected to the electronic comprising device. The embedding process can be a lamination process, wherein a temperature of least 110° C. for at least 5 minutes under a pressure of at least 200 psi is used for the lamination process, the battery providing a shift in open circuit voltage or capacity of less than 10% following the lamination process. The lamination temperature can be at least 130° C. for at least 10 minutes under a pressure of at least 230 psi, with the battery again providing a shift in open circuit voltage or capacity of less than 10% following the lamination process.

The embedding process can comprise an injection molding process, the battery providing a shift in open circuit voltage or capacity of less than 10% following an injection molding process comprising a temperature of at least 200° C. and a pressure of at least 1000 psi. The injection molding temperature can be at least 250 C and the pressure can at least 5000 psi, with the battery providing a shift in open circuit voltage or capacity of less than 10% following the injection molding process.

The battery can be formed by laminating only two layers. In this embodiment of the invention, a first layer is the PME disposed on the cathode and the second layer is the anode.

BRIEF DESCRIPTION OF THE DRAWINGS

A fuller understanding of the present invention and the features and benefits thereof will be accomplished upon review of the following detailed description together with the accompanying drawings, in which:

FIG. 2 is a table illustrating ionic conductivity and the resulting film composition at 20.5° C. for a PME comprising the polyimide shown in FIG. 1(m), LiTFSi salt (2.2x) and the solvent gamma butyrolactone (GBL), according to an embodiment of the invention.

FIG. 6 is a table which includes dianhydrides and aromatic diamines that can be used for making polyimides presented herein.

DETAILED DESCRIPTION

Figure 1A:
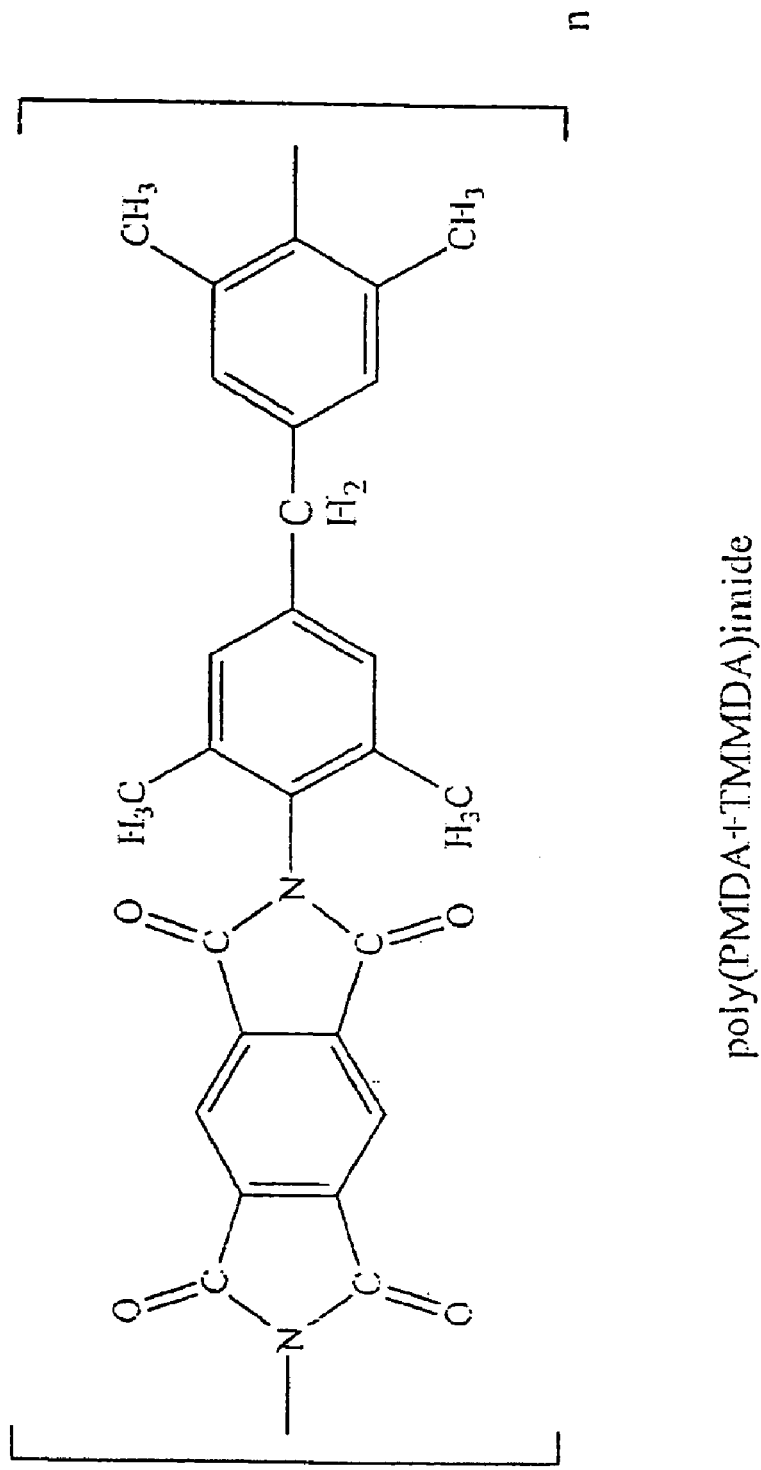
FIG. 1(a)-(m) illustrates the repeat unit structure for several suitable polyimides, according to an embodiment of the invention.

The invention describes an IC card including at least one electronic device and battery embedded therein. The battery is electrically connected to the electronic comprising device, such as an integrated circuit (IC) for providing power for the device. The battery comprises an anode, a cathode and a substantially optically clear electrolyte separator matrix between the anode and cathode.

The separator matrix includes a polyimide, a lithium salt and some solvent. The lithium salt is in a concentration of at least 0.5 moles of lithium per mole of imide ring provided by the polyimide. The solvent is generally a low molecular weight, low viscosity liquid which swells the polyimide at low concentration and at a sufficiently high concentration allows the polyimide, salt and the solvent to become homogeneously mixed. As used herein, the substantially optically clear electrolyte separator matrix is referred to as a "polymer matrix electrolyte" or PME.

The battery can be both a lithium ion and lithium metal battery. Unlike gel polymer electrolytes, once the PME is formed, there is generally no free solvent or identifiable pores. For example, using a SEM at a 50 A resolution, no pores in the PME can be identified. Instead, the solvent is integrated with the polymer and the lithium salt in a homogeneous and substantially optically clear matrix. In addition, unlike conventional gel polymers where the polymer only provides mechanical support, the polymer, salt and solvent comprising the PME all participate in ionic conduction.

The PME provides high current carrying capacity, cycling stability and maintains this performance level across a wide temperature range, such as at least from −40° C. to 100° C. For example, the PME can withstand high temperatures and pressures with small changes in open circuit voltage and capacity, such as the conditions generally used in the hot lamination processes used in credit card manufacturing, or even a typical injection molding process. For example, hot lamination processes used in credit card assembly generally utilize a temperature of about 115–150° C. for typically 5 to 15 minutes under a pressure of about 200–250 psi. The performance of batteries formed using the PME experience no significant change in open circuit voltage (OCV) or capacity from the temperature and pressure conditions provided by a typical credit card lamination process.

As used herein, the phrase "no significant change in OCV and capacity" following a lamination or molding process refers to a battery including the PME which demonstrates an OCV and capacity which shifts less than 15%, preferably less than 10%, and more preferably less than a 5% following the lamination or molding process.

For example, a lithium metal battery having a lithium vanadium oxide comprising cathode was found to provide a shift in OCV of 1.4% and a commensurately small reduction in capacity following a lamination process comprising a temperature of 140 C for 15 minutes under a pressure of 220 psi. Moreover, batteries formed using the PME are quite flexible and can exceed ISO standards ISO/IEC 10373 and 14443.

Thus, PME based batteries are particularly well suited for use inside credit cards, smart labels, and other small devices which require high temperature/high pressure lamination processing and can benefit from an on board power supply. Regarding credit card and related applications for the invention, the high level of battery stability to both mechanical and thermal stresses provided by the PME permits batteries according to the invention to withstand harsh credit card processing conditions.

The PME is generally based on one or more polyimides, which unlike other polymer-based electrolytes, participate in ionic conductivity through the presence of imide rings and other polar groups. Other polymer types which include highly polar groups having functional groups that can complex with lithium salts and participate in ionic conduction include polybenzimidazoles and polyamide-imides. Accordingly, these polymer types may also include species useful in forming a PME.

Polyimides are reaction products of a condensation reaction between diamines and dianhydrides to initially form a poly (amic-acid) intermediate. Either or both the diamine and dianhydride reagent can be mixture of diamine or dianhydride species. The poly amic-acid intermediate is then converted to a fully imidized polyimide.

The properties of the resulting polyimide formed depend on the selection of the particular diamines and dianhydride monomers. Polyimides are generally known to provide high thermal stability, chemical resistance and high glass transition temperatures, such as 200° C. to more than 400° C.

The current invention has identified polyimides distinct from those disclosed in the '672 patent and has found the addition of solvent to some of these distinct polyimides can result in the formation of a PME. Some of the polyimides identified herein provide represent newly synthesized polymers. Unlike the polymers disclosed in '672, the polymers disclosed herein form a substantially homogeneous matrix material (PME) when combined with an appropriate concentration of salt and the solvent. The homogeneity is evidenced by the high level of optical clarity provided by the PME as noted in Example 1. In contrast, the electrolytes disclosed in '672 are non-homogeneous mixture, as evidenced by their opaqueness also shown in Example 1 which is indicative of phase separation of the respective components.

The Inventors have identified and synthesized improved polyimides for use in forming PMEs by qualitatively relating certain polymer parameters to ionic conductivity. Imide ring density is believed to explain why polyimide films, when loaded with lithium salt, show significant ionic conductivity, even in the absence of solvent. Repeat unit weight per imide ring is one measure of imide ring density and is calculated by dividing the molecular weight of the entire repeat unit of the respective polyimides by the number of imide rings within the respective repeat units.

Imide rings may provide the equivalent of a high dielectric constant to materials because of the high electron density provided by the rings. Accordingly, it is believed that the interaction between the imide rings and the lithium ion is a factor in determining the ionic conductivity of a PME. Thus, improved polyimides for use as PMEs can be generally selected for further consideration by first calculating the number of imide rings (and to a lesser degree other highly polar groups, such as sulfone, carbonyl and cyanide) per molecular repeat unit in a given polyimide. The more imide ring function present per unit weight, the higher the average dielectric strength equivalence of the polymer. Higher equivalent dielectric strength is believed to generally lead to improved salt interaction, which can improve the ionic conductivity of the PME.

Alternatively, a quantity roughly inverse to imide ring density referred to as repeat unit weight per imide ring can be calculated to also compare the relative concentration of imide rings in polyimides. As the repeat weight per imide ring decreases, imide rings become an increasingly greater contributor to the repeat unit as a whole. As a result, as the repeat weight per imide ring decreases, the equivalent dielectric constant and ionic conductivity of the polyimide generally increase.

Polyimides which provide high helium permeability may generally produce higher ionic conductivity and thus form better PMEs. At 25° C., the measured He permeability of most polyimides according to the invention has been found to be at least 20 barrers. The He permeability can be at least 25, 30, 35, 40, 45, 50, 55, 60, 65, 70, 75 or 80 barrers, or more.

Helium permeability may be measured in the following suggested manner. The gas permeability (GP) of a gas component through a given film having a thickness (I) and area (A) can be determined by applying a pressure (p) across the film which is equal to the upstream pressure minus the downstream pressure of the gas component and measuring the resulting steady state rate of gas flow (f) permeating through the film at STP.

$$GP=(f\prime)/(Ap)$$

Preferred units for GP is $(cm^2)(sec)^{-1}(cmHg)$, where 1 barrer is defined as the GP multiplied by $10^{10}$.

It is believed that the maximum ionic conductivity of the PME generally occurs when the polyimide/salt/solvent combination creates a completely homogenous, clear matrix. Any phase separation is expected to reduce the ionic conductivity values because phase separation would increase the tortuosity within the PME.

The maximum electrolyte conductivity of the PME at a given temperature generally occurs when the polyimide/salt/solvent matrix has a ratio within a specified range. The optimum salt concentration is generally in the range of 0.5 to 2.0 moles Li per mole of imide ring for a polyimide. Too little salt generally does not provide a sufficient number of ions to contribute to the charge transfer. Too much salt generally leads to phase instability and possible precipitation of the polyimide and resulting loss of homogeneity which can be verified by a loss in optical clarity.

The solvent is believed to play the role of a swelling agent for the polymer to move the backbone chains slightly apart and therefore enables greater ionic diffusion coefficients. The solvent also acts as a solvation carrier for the ions. Typically the solvent is chosen to also be stable within the limitations of the type of battery chosen. For example, for a lithium ion type battery the solvent must be stable up to the reduction potential of lithium metal. The amount of solvent can be optimized depending upon the either the conductivity desired or the softening point of the matrix at some required temperature. Solvents can be selected from a group of solvents including gamma butyrolactone (GBL), propylene carbonate, N-methylpyrrolidinone (NMP), tetrahydrothiophen-1,1-dioxide (TMS), polycarbonate (PC) and dimethyl formamide (DMF).

FIG. 1(a)-(m) illustrates the repeat unit structure for several polyimides, according to an embodiment of the invention. The repeat unit for a polymer referred to as Polyimide A is shown in FIG. 1(a). This polyimide can be formed by reacting PMDA [89-32-7] with TMMDA [4037-98-7]. This high molecular weight polymer is soluble in NMP for a limited number of hours thus a lithium salt containing electrolyte could not be produced.

Figure 1B:
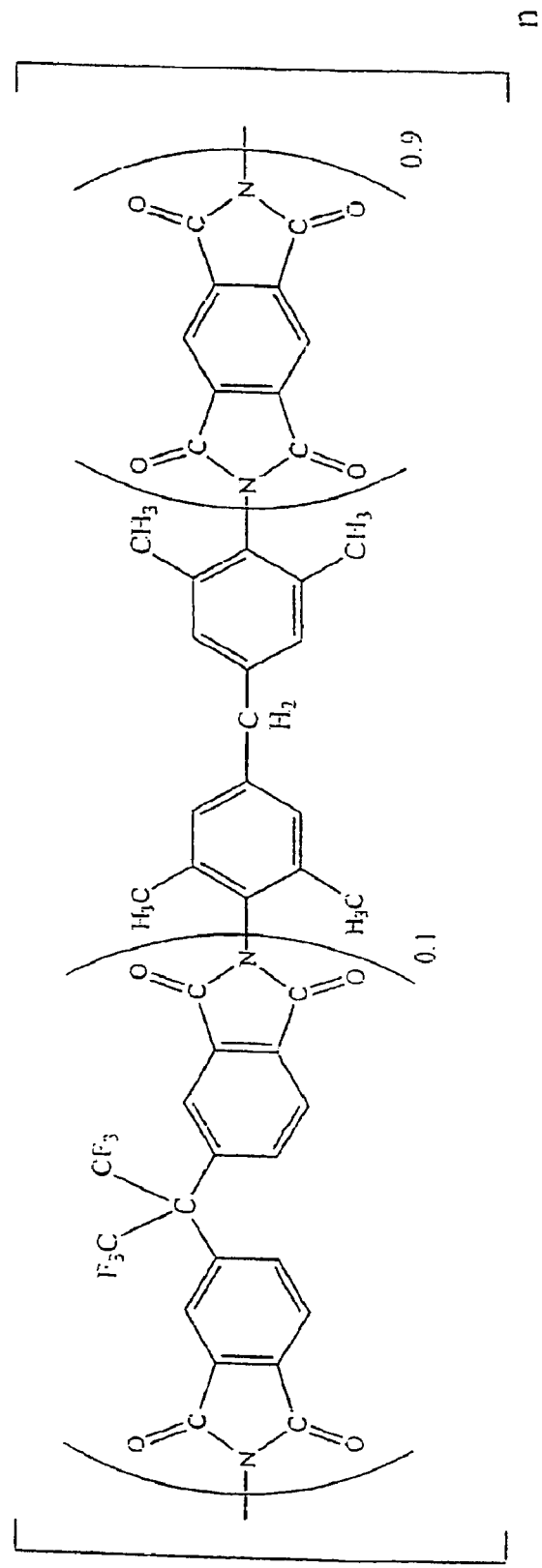

The repeat unit for the polymer referred herein as Polyimide B is shown in FIG. 1(b). This polyimide can be formed by reacting 90 mole % PMDA [89-32-7], 10 mole % 6FDA [1107-00-2] dianhydrides and the diamine TMMDA [4037-98-7]. The polymer formed was soluble indefinitely in NMP at 20% by weight.

The repeat unit for the polymer referred herein as Polyimide C is shown in FIG. 1(c). This polyimide can be formed by reacting 85.7 mole % PMDA [89-32-7], 14.3 mole % 6FDA [1107-00-2] and TMMDA [4037-98-7]. The polymer formed was soluble indefinitely in NMP at 20% by weight.

Figure 1D:
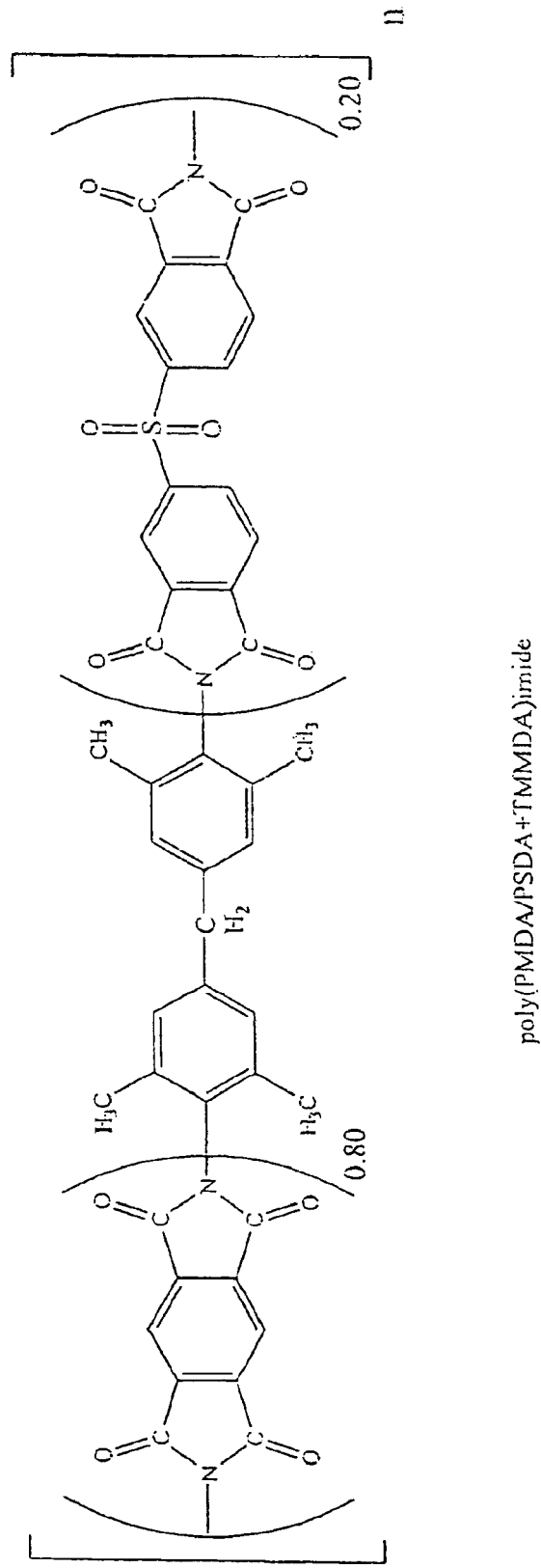

The repeat unit for the polymer referred herein as Polyimide D is shown in FIG. 1(d). This polyimide can be formed by reacting 80 mole % PMDA [89-32-7], 20 mole % PSDA [2540-99-0] and TMMDA [4037-98-7]. The polymer formed was soluble indefinitely in NMP at 20% by weight.

Figure 1E:
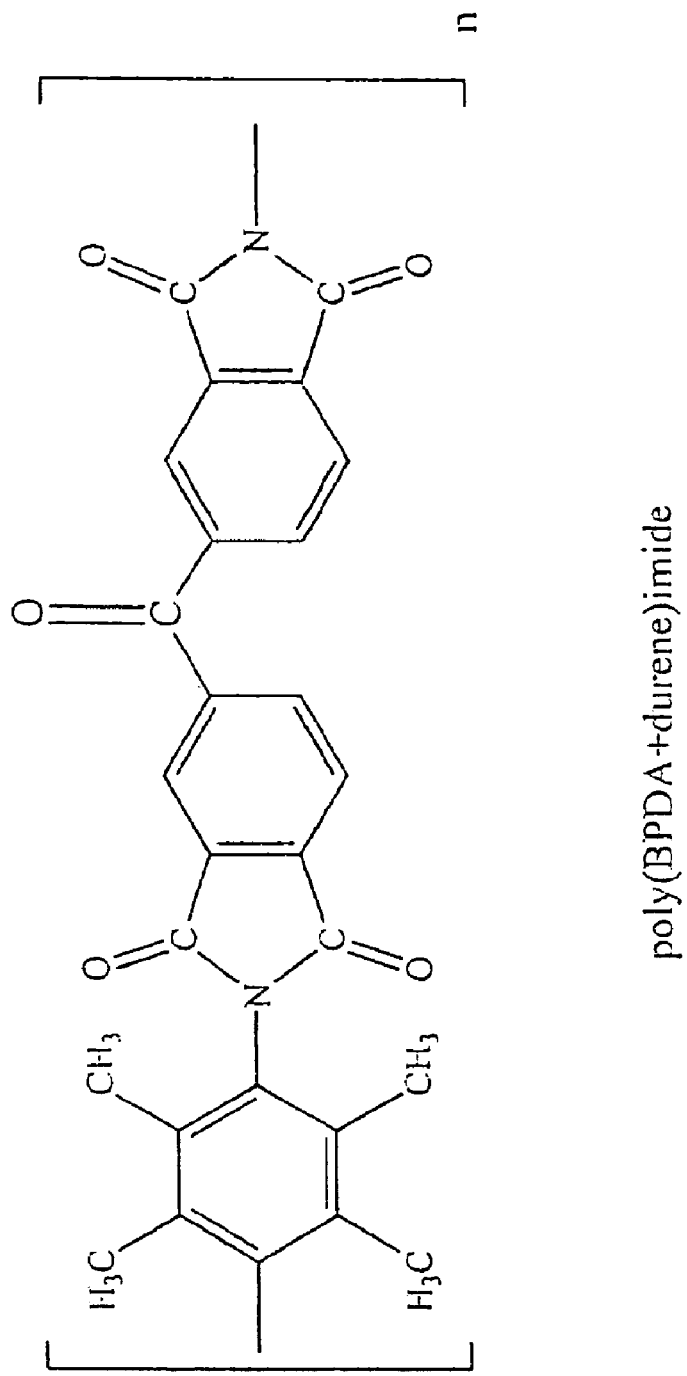

The repeat unit for the polymer referred herein as Polyimide E is shown in FIG. 1(e). This polyimide can be formed by reacting BPDA [2421-28-5] and 3,6diaminodurene [3102-87-2]. The polymer formed was soluble indefinitely in NMP at 20% by weight.

Figure 1F:
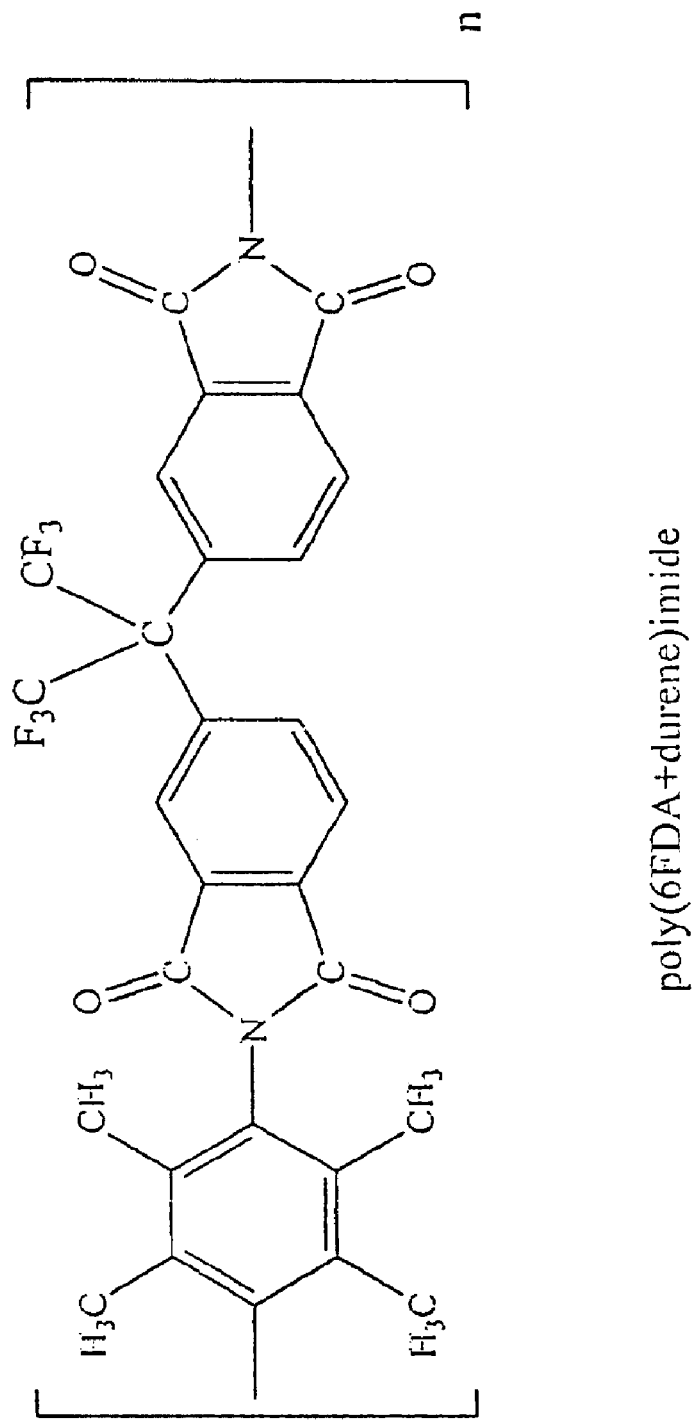

The repeat unit for the polymer referred herein to as Polyimide F is shown in FIG. 1(f). This polyimide can be formed by reacting 6FDA [1107-00-2] and 3,6-diaminodurene [3102-87-2]. The polymer formed was soluble indefinitely in NMP at 20% by weight and is also soluble in acetone, GBL, DMAc, and DMF.

Figure 1G:
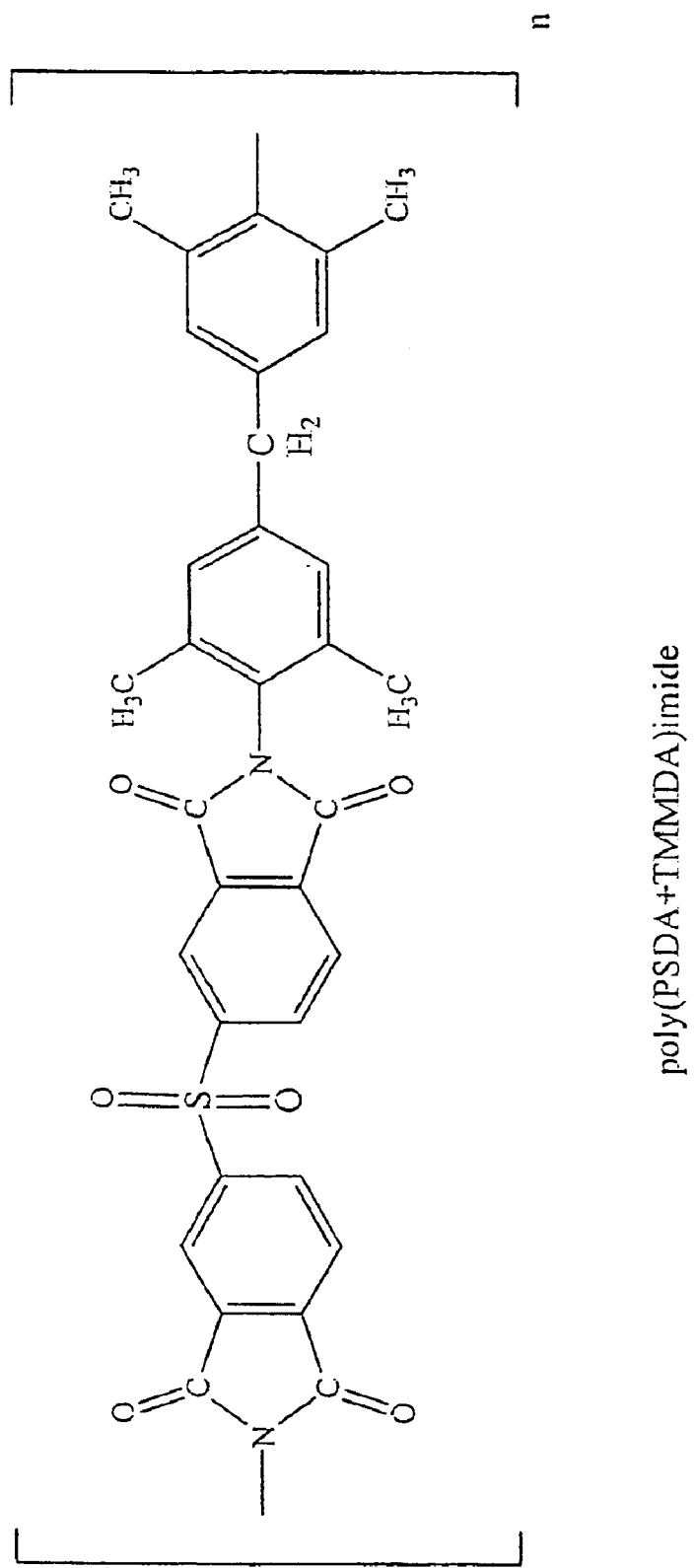

The repeat unit for the polymer referred herein to as Polyimide G is shown in FIG. 1(g). This polyimide can be formed by reacting PSDA [2540-99-0] and TMMDA [4037-98-7]. The polymer formed was soluble indefinitely in NMP at 20% by weight and is soluble in GBL.

The repeat unit for the polymer referred herein to as Polyimide H is shown in FIG. 1(h). This polyimide can be formed by reacting 6FDA [1107-00-2] and TMMDA [4037-98-7]. The polymer formed was soluble indefinitely in NMP at 20% by weight and is soluble in acetone, GBL, DMAc, and DMF.

Figure 1:
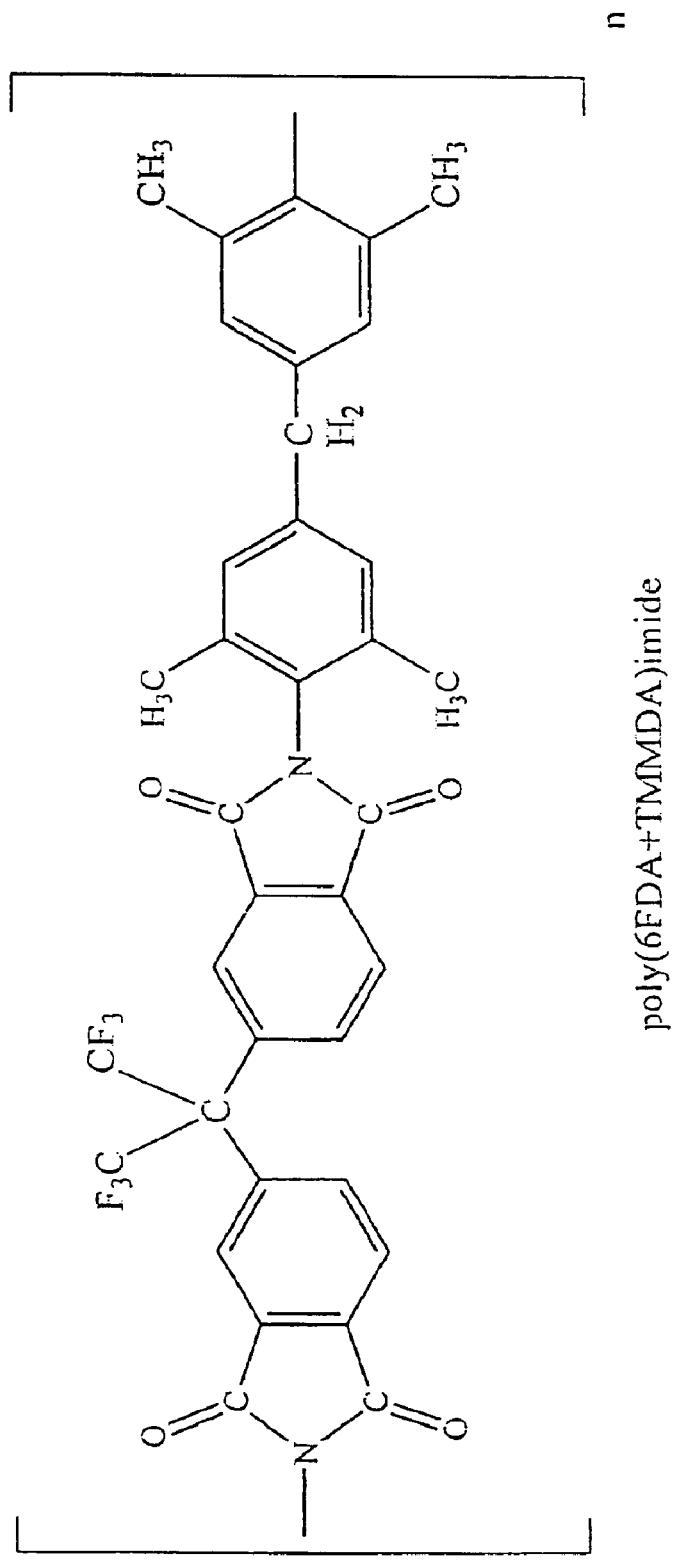
Figure 1I:
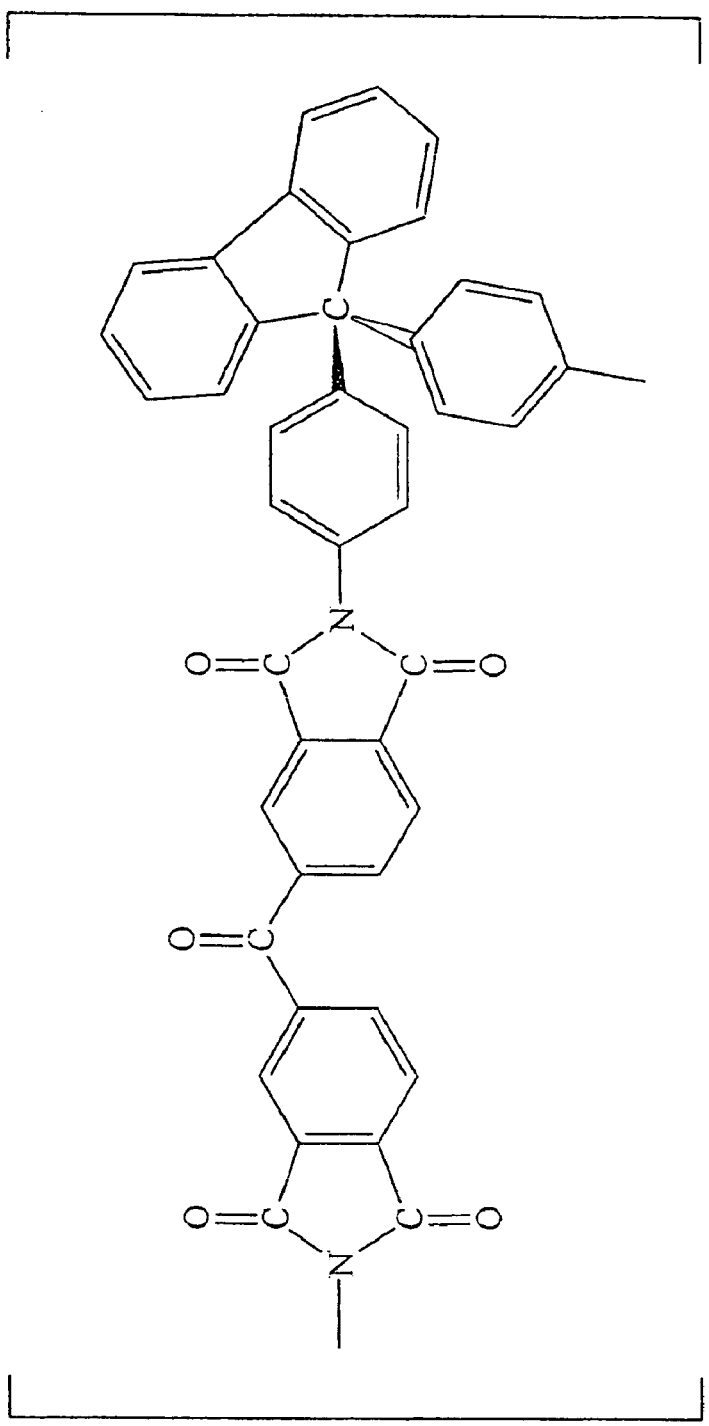

The repeat unit for the polymer referred herein to as Polyimide I is shown in FIG. 1(i). This polyimide can be formed by reacting BPDA [2421-28-5] and 4,4'-(9-fluorenylidene)dianiline [15499-84-0]. The polymer formed was soluble indefinitely in NMP at 20% by weight.

The repeat unit for the polymer referred herein to as Polyimide J is shown in FIG. 1(j). This polyimide can be formed by reacting PMDA [89-32-7], 33.3 mole % TMPDA [22657-64-3] and 66.7 mole % TMMDA [4037-98-7]. The polymer formed was soluble indefinitely in NMP at 20% by weight.

The repeat unit for the polymer referred herein to as Polyimide K is shown in FIG. 1(k). This polyimide can be formed by reacting PMDA [89-32-7] and DAMs [3102-70-3]. The polymer formed was soluble only for a short time in NMP.

Figure 1L:
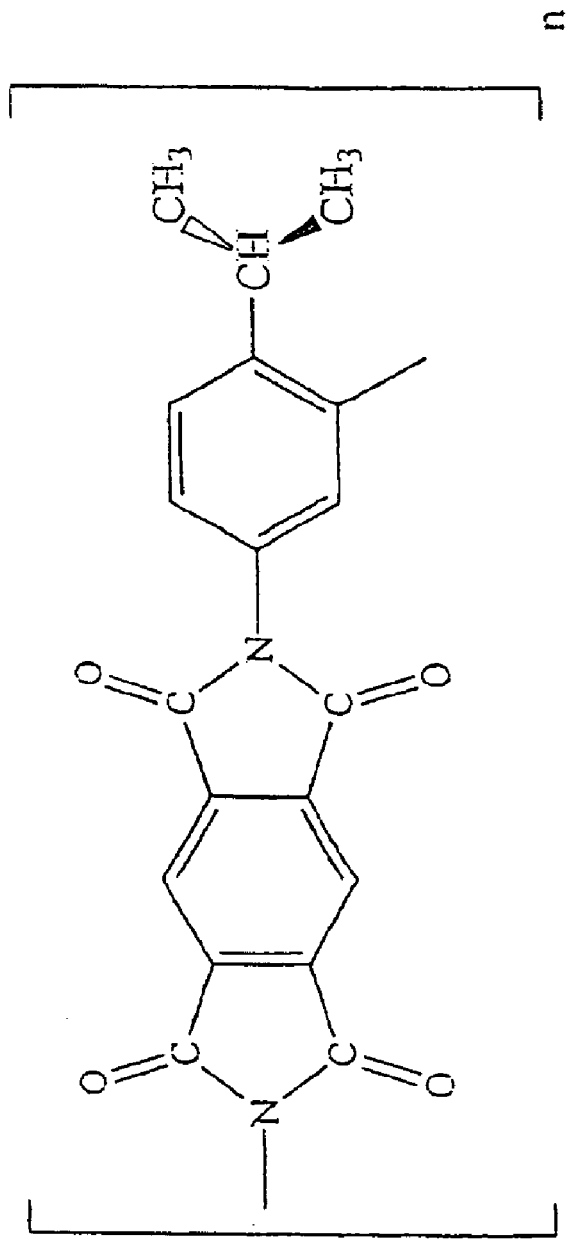
Figure 3A:
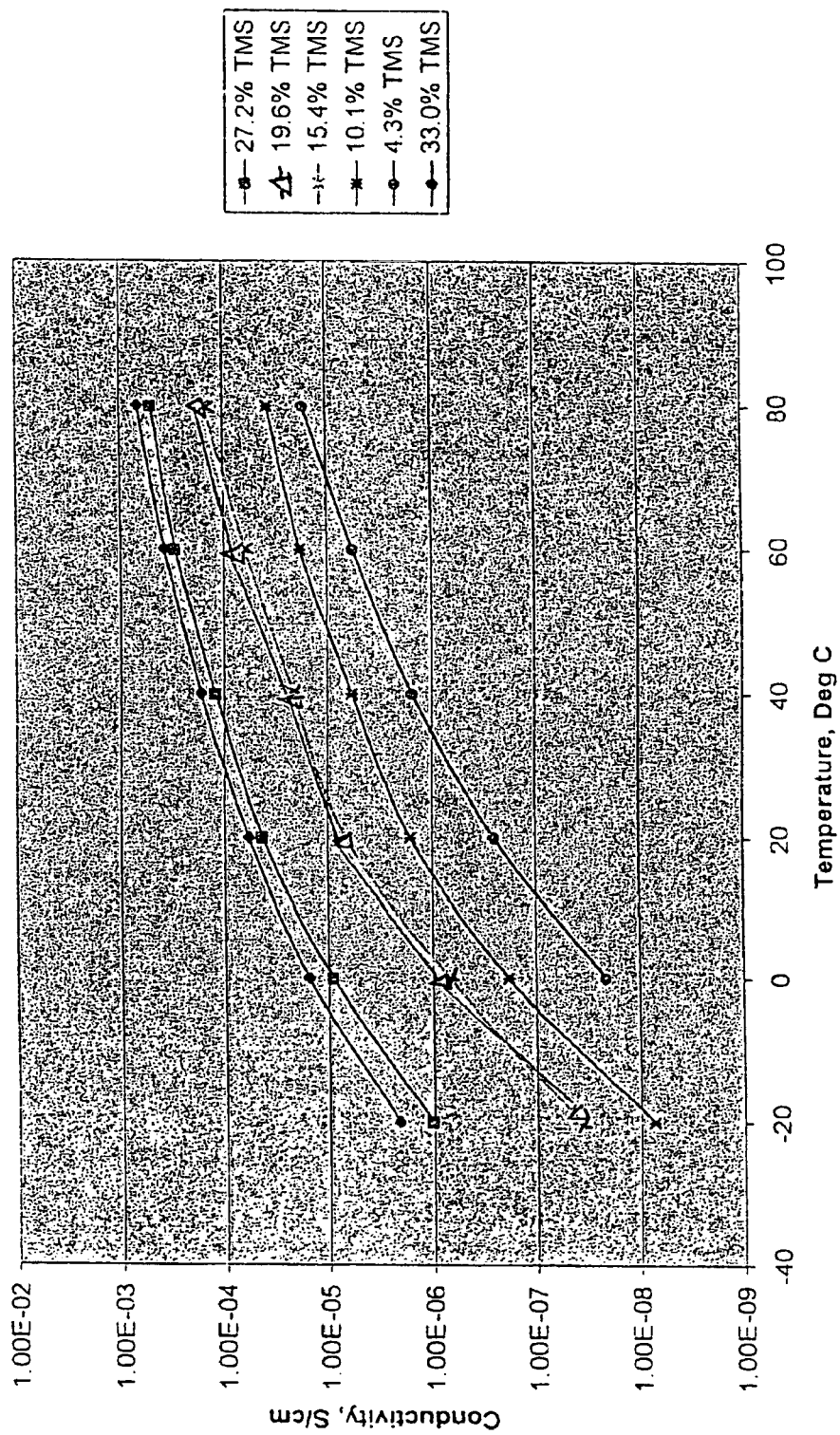
FIG. 3(a)-(d) are plots of the ionic conductivity of a PME comprising the polyimide shown in FIG. 1(m) and the lithium salt LiTFSi (2.2x) as a function of solvent load and temperature for the solvents TMS, PC, GBL, and NMP, respectively.
Figure 3B:
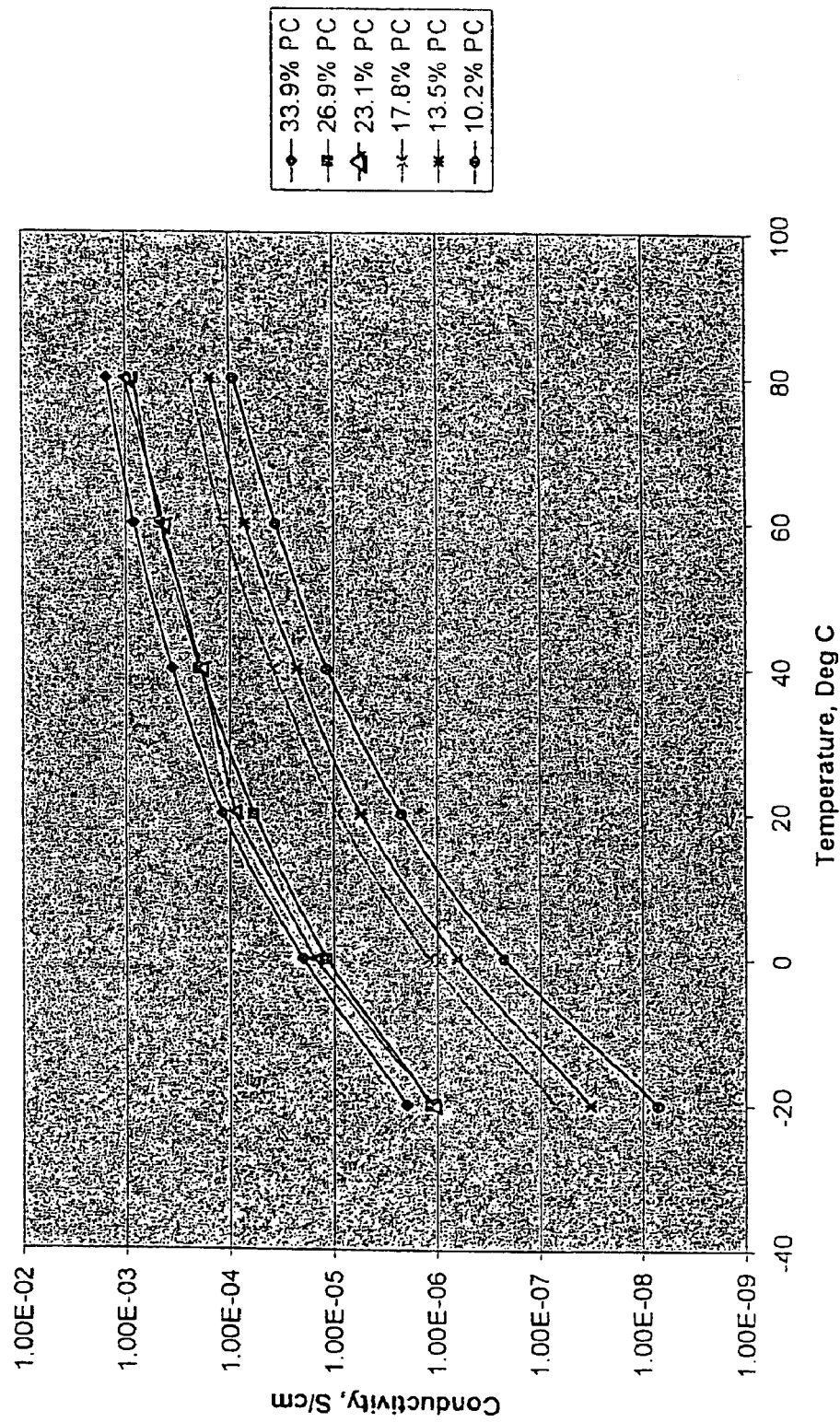
Figure 3C:
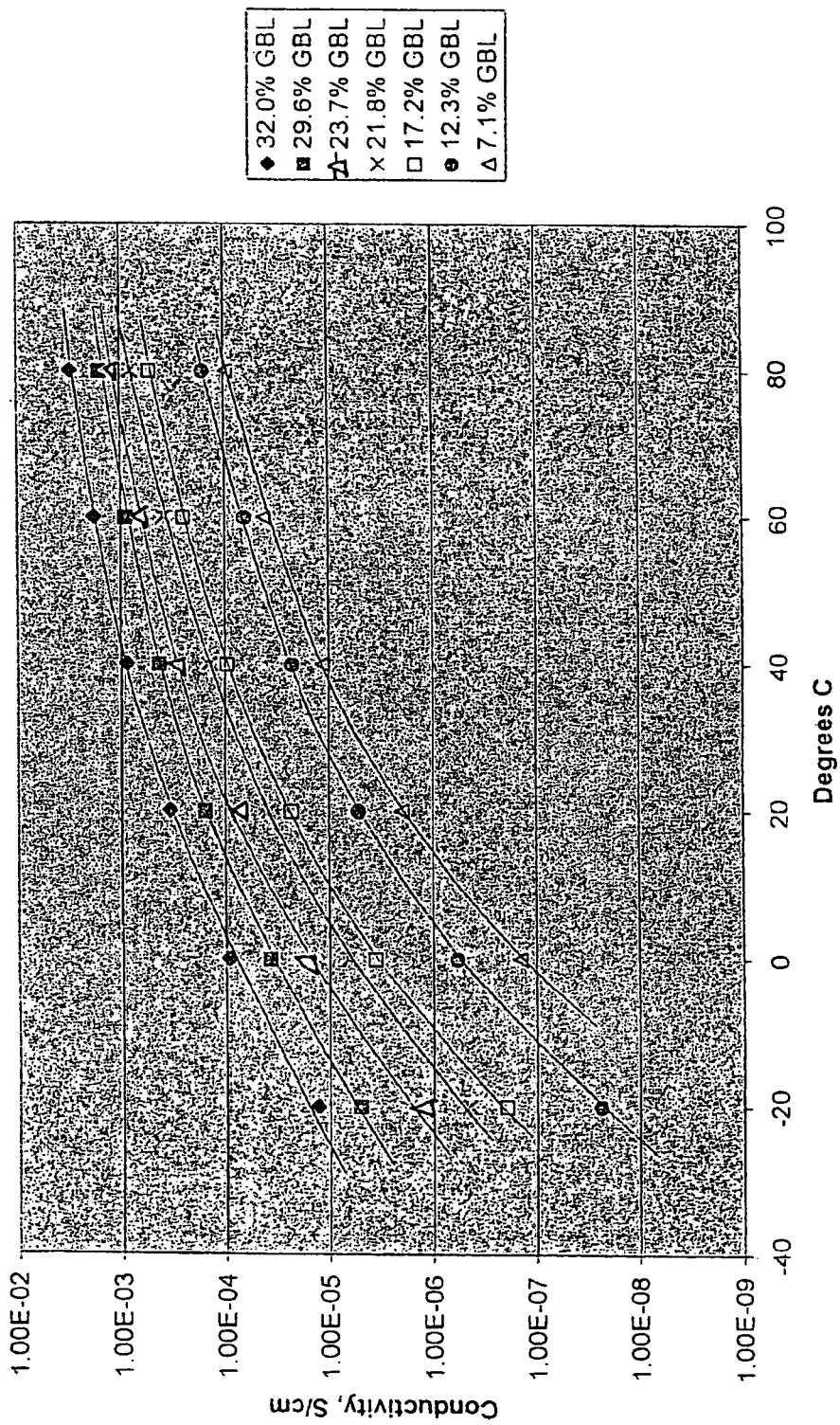
Figure 3D:
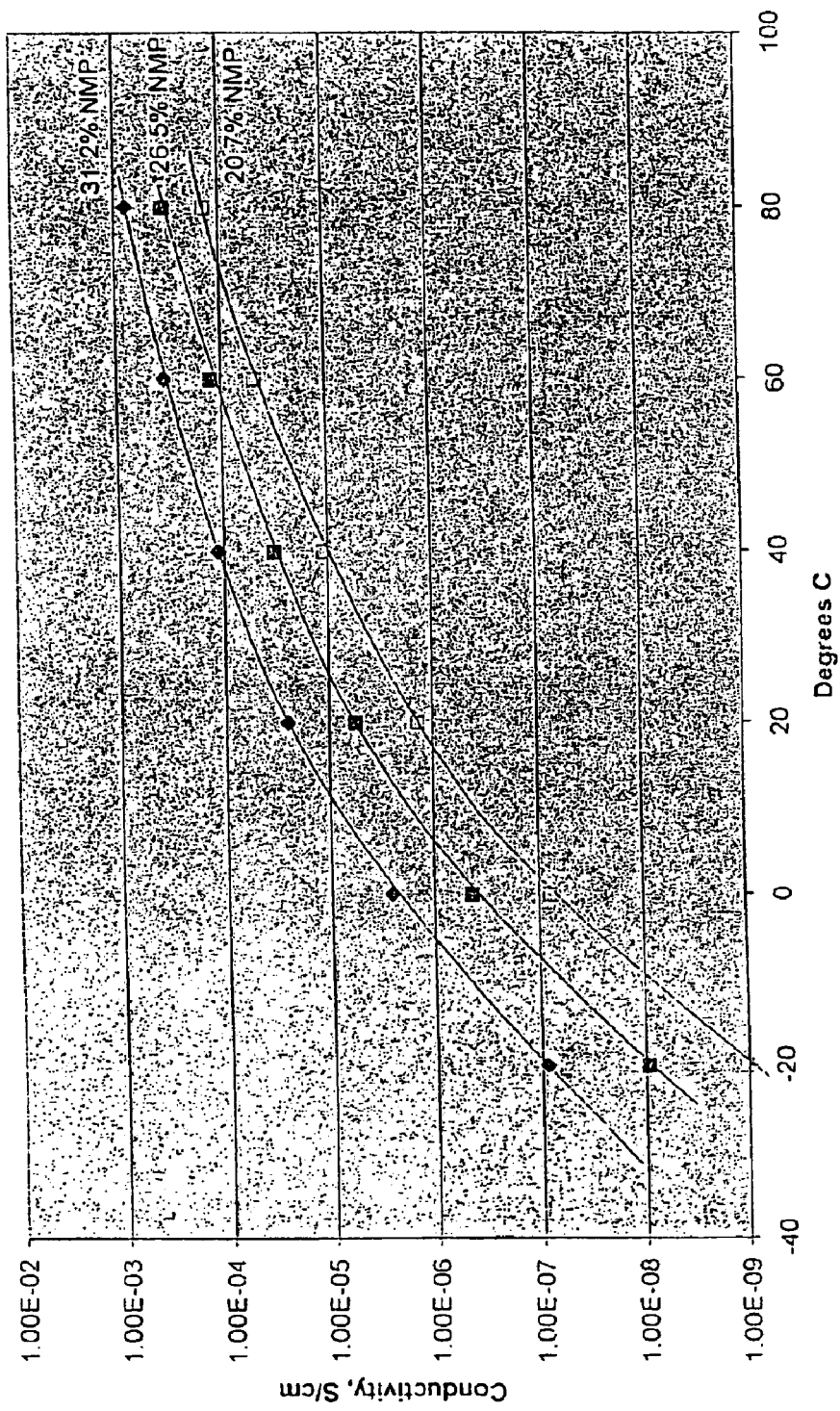

The repeat unit for the polymer referred to herein as Polyimide L is shown in FIG. 1(l). This polyimide can be formed by reacting PMDA [89-32-7] and 4-isopropyl-m-phenylenediamine [14235-45-1]. The polymer formed was soluble indefinitely in NMP at 20% by weight.

The repeat unit for the polymer referred herein to as Polyimide M is shown in FIG. 1(m). This polyimide can be formed by reacting PMDA [89-32-7], 33.3 mole % DAMs [3102-70-2] and 66.7 mole % TMMDA [4037-98-7]. The polymer formed was soluble indefinitely in NMP at 20% by weight.

The PME includes at least one lithium salt. High PME ion conductivities are generally achieved using a high salt content, such as from about 0.5 to 2.0 moles of Li per mole of imide ring for polyimide polymers. However, the concentration of lithium salt can be 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.3, 2.4 or 2.5 moles Li per mole of imide ring of the polyimide.

Salt concentrations are also described herein as a ratio of the weight of the salt to weight of the polymer (e.g. polyimide) excluding the salt. For example, a 1× concentration corresponds to an equal amount of salt and polymer, while a 2× salt concentration corresponds to twice the salt concentration as compared to the polymer concentration. The lithium salt can generally be any lithium salt known in the art. Preferably, lithium salts are chosen from LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)_2N$, $Li(CF_3SO_2)_3$, $Li(CF_3CO_2)$, $Li(B(C_6H_5)_4$, $Li(SCN)$, and $Li(NO_3)$, lithium bis(trifluorosulfonyl)imide (LiTFSI), LiBOB, and LiSCN. Preferably, the salt is either $Li(PF_6)$ or LiTFSi.

Polyimide structures other than the exemplary structures shown in FIG. 1 can be good candidates for use in forming a PME matrix. Characteristics that a good PI should display, such as solubility in NMP (or other suitable solvent) to at least 20 wt % and a low repeat unit weight per imide ring can be a first criteria. However, the solubility of the PI itself or the solution stability when combined with a high concentration of a lithium salt applicable for battery applications is not easily predictable.

Behavior in solution can not generally be ascertained by simply looking at the polymer repeat unit structure. However, it can be determined from looking at the structure whether the polymer will possibly be crystalline, or whether it would have a high or low relative density in the solid phase. The polyimides are preferably non-crystalline, low-density repeat structures because they would be most likely to be very soluble. However, changing a single side group from a methyl to an ethyl can cause the properties of the PI to be changed from useful to of no use. A suggested screening procedure to identify alternative polyimides for battery applications is to take a polyimide that is known to have a good solubility in the solvent itself and then try to introduce the lithium salt at 0.5 mole Li per imide ring or more and see if (i) the resulting PI/salt/solvent solution is clear and homogenous for a few hours and (ii) the film cast from that solution remains substantially clear when most of the solvent (e.g. 95%) has been evaporated.

FIG. 2 is a table illustrating the ionic conductivity at 20.5° C. and the corresponding film composition for a polyimide based PME comprising the polyimide shown in FIG. 1($m$), LiTFSi salt (2.2×) and the solvent GBL, according to an embodiment of the invention. Room temperature ionic conductivity values for PME films were calculated from measured impedance using a complex impedance analyzer. Measurements using the impedance analyzer were made in the frequency range of 1 MHz to 0.1 Hz. A value for the resistance of the film, R, was taken as the intercept with the real axis of a Nyquist plot, or by an extrapolation of the high frequency portion of the response curve to the real axis. Measurements were also made on an LCR meter at a fixed frequency of 10 kHz where the resistance values were read directly. The ionic conductivity was calculated using the formula:

$$C(\text{Seimens/centimeter}) = t/R \times 10^{-4}$$

where t is film thickness in microns and R is the measured film resistance in Ohms.

As shown in FIG. 2, for the PMEs tested, the maximum ionic conductivity at 20.5° C. was about $1 \times 10^{-4}$ S/cm for a 1× salt concentration and $4 \times 10^{-4}$ S/cm for a 2.2× concentration, where the PME film comprised 37.9% GBL. The lower table portion shown in FIG. 2 shows the minimum solvent level required to provide a conductivity of $1 \times 10^{-4}$ S/cm for 1.0, 1.4, 1.8 and 2.2× salt concentrations.

The range of solvent in FIG. 2 is expressed as the solvent/PI ratio and runs from about 1 to about 2. The lower value is where one arbitrarily defines a conductivity as being "high enough" to be of interest, such as $1.0E^{-4}$ S/cm. The maximum conductivity was found to occur between a solvent/PI ratio of 1.5 to 2.0 depending upon the salt concentration.

The upper solvent/PI limit near 2 is controlled by the mechanical properties of the PME. At a high solvent/PI ratio the PME film becomes very soft and may not be usable over an extended temperature range as a separator for a battery. Applied to lithium metal batteries, As a practical matter, the solvent is chosen to be moderately stable against lithium metal, high boiling (>150 C), capable of dissolving the chosen salt and swelling the PI, and finally it should have a low viscosity which promotes a high conductivity for the salt/solvent combination by itself, as well as for the PME.

To optimize the respective PI, salt and solvent concentrations, a suggested procedure is described below in a first step, a PI species is selected which is soluble in an appropriate solvent, such as NMP or GBL. All the polyimides shown in FIG. 1 except the polyimide shown in FIG. 1($k$), are soluble in NMP. In the second step, a desired lithium salt is selected and an initial concentration is selected, such as a mass ratio that gives one lithium ion per imide ring provided by the selected PI. The solvent concentration can then be varied from a solvent/PI ratio of about 0.8 to 2.0 while measuring the ionic conductivity for several solvent/PI data points in between. This can be repeated at salt concentrations both higher and lower. There are generally several combinations of PI/salt/solvent by mass that will give similar ionic conductivities, such as within a factor of two.

FIG. 3($a$)-($d$) are plots of the ionic conductivity of a PME comprising the polyimide shown in FIG. 1($m$) and the lithium salt LiTFSi (2.2×) as a function of solvent load and temperature for the solvents TMS, PC, GBL, and NMP, respectively. These curves generally do not show a clear conductivity maximum because the salt content was 2.2×, and as a result, the amount of solvent needed to provide the maximum ionic conductivity was large and generally impractical.

Figure 4:
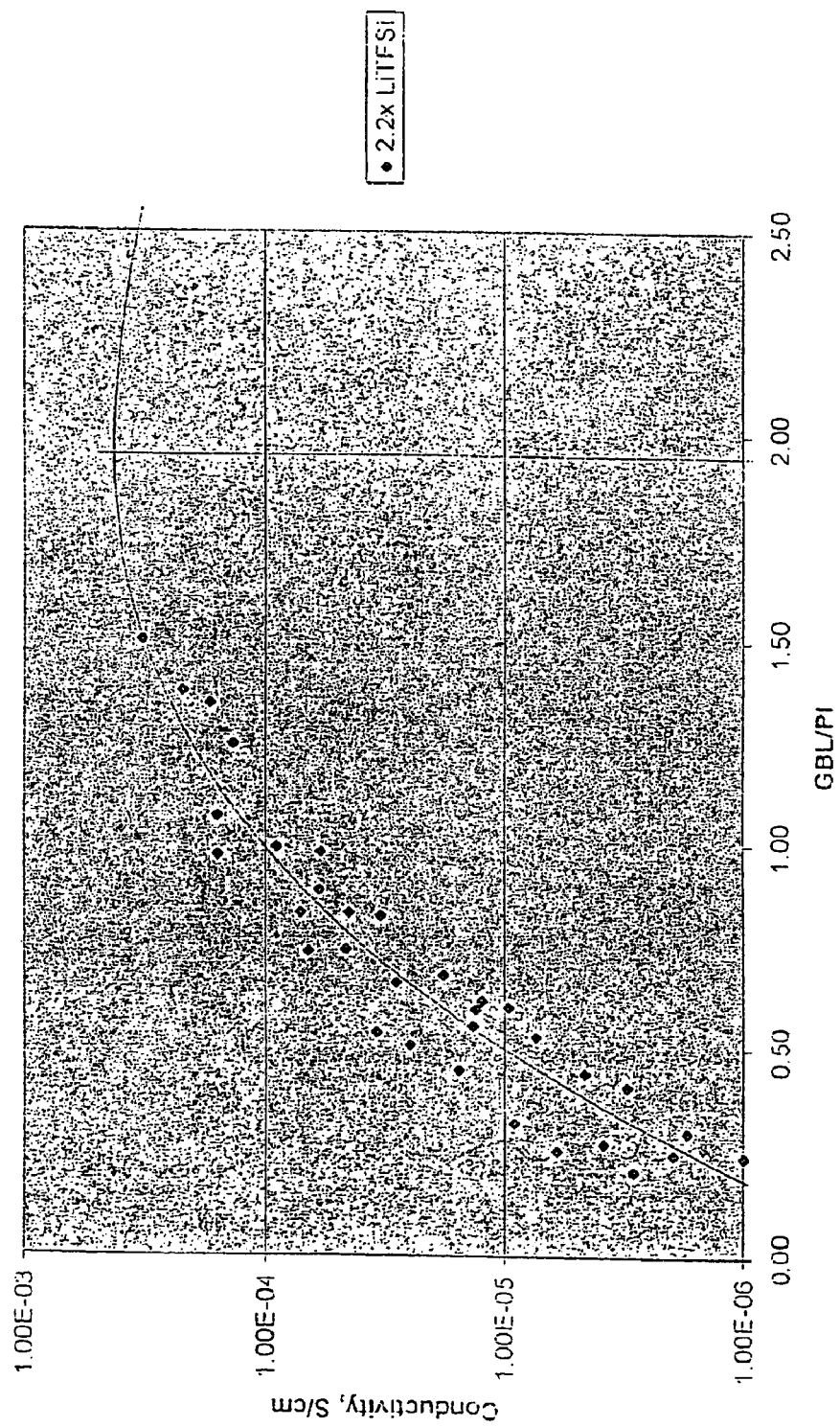
FIG. 4 is a plot of ionic conductivity of a PME comprising the polyimide shown in FIG. 1(m) and a lithium salt (LiTFSi; 2.2x) as a function solvent/polyimide ratio at 20 C, where the solvent is GBL.

FIG. 4 is a plot of ionic conductivity of a PME comprising the polyimide shown in FIG. 1($m$) the lithium salt (LiTFSi; 2.2×) as a function solvent/polyimide ratio at 20° C., where the solvent is GBL. The ionic conductivity is seen to increase for increasing solvent to polyimide ratio up to about a GBL/polyimide ratio of about 1.5, where the ionic conductivity levels off at a value of about $7 \times 10^{-4}$ S/cm.

The ionic conductivity of PMEs based on polyimides is believed to be related to the degree the polyimides associate with alkali salts, particularly Li salts. This association is likely related to the formation of complexes between polar groups (e.g. imide and benzene) of the polyimide and the salt. Evidence for this association can be found by measuring the absorption frequencies displayed by the polymer when intermixed with the salt and comparing this data to the absorption frequencies displayed by the polyimide and the salt by themselves.

For a polyimide, characteristic absorption frequencies are believed to be related to the imide rings and benzene rings that comprise the polyimide backbone. These absorption peaks are at about 1778 $cm^{-1}$ and 1721 $cm^{-1}$ for the imide ring and 730 $cm^{-1}$ for the benzene ring. Common Li salts, including $LiPF_6$, LiBOB, LiI and LiTFSi do not show absorption at these frequencies, nor any absorption peaks between about 1630 and 1690 $cm^{-1}$. However, when certain polyimides which associate strongly with Li salts are combined with those salts, the resulting polyimide/salt film show the emergence of a very strong doublet with a first peak at about 1672 $cm^{-1}$ and a second peak at about 1640 $cm^{-1}$ The first absorption frequency is present when a significant concentration of salt is in the polyimide film, such as at least 33 wt. %, but does not change significantly with increasing salt concentration. Thus, this peak can be used to indicate the interaction, provided a sufficient salt concentration is present. The magnitude of the second peak is nearly proportional to the ratio of the Li ion concentration to the imide rings and can be used to assess the extent of the interaction between the polyimide and the salt.

Polymers other than polyimides which provide a high relative local electron density (e.g. comparable to electron density adjacent to imide rings in polyimides) and the potential for charge separation due to multiple bond conjugation may form a polymer/salt complex and display characteristic absorption peaks based on the complex formed, provided they are soluble. Thus, absorption spectroscopy, such as FTIR can be used to identify these soluble non-polyimide polymers which show evidence of complex formation for use as a PME.

Figure 5A:
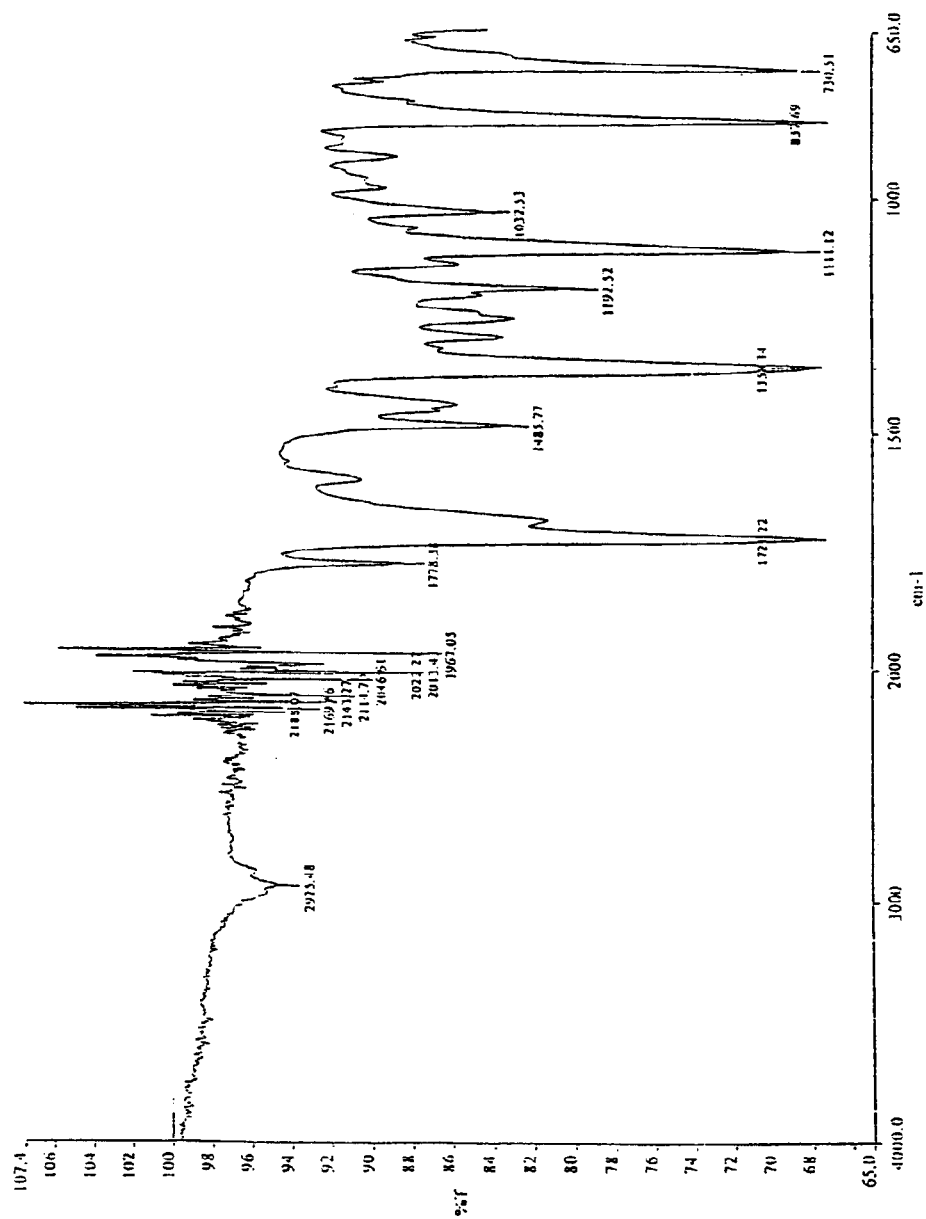
FIG. 5(a) is FTIR data for an exemplary polyimide without the addition of a Li salt or any solvent.

FIG. 5(a) is FTIR data for an exemplary polyimide, the polyimide shown in FIG. 1(c), without the addition of a Li salt or any solvent. Absorption peaks related to the imide rings are shown at about 1778 cm$^{-1}$ and 1721 cm$^{-1}$ and at 730 cm$^{-1}$ for the benzene ring. This polyimide does not show any detectable absorption peaks between about 1630 and 1690 cm$^{-1}$.

Figure 5B:
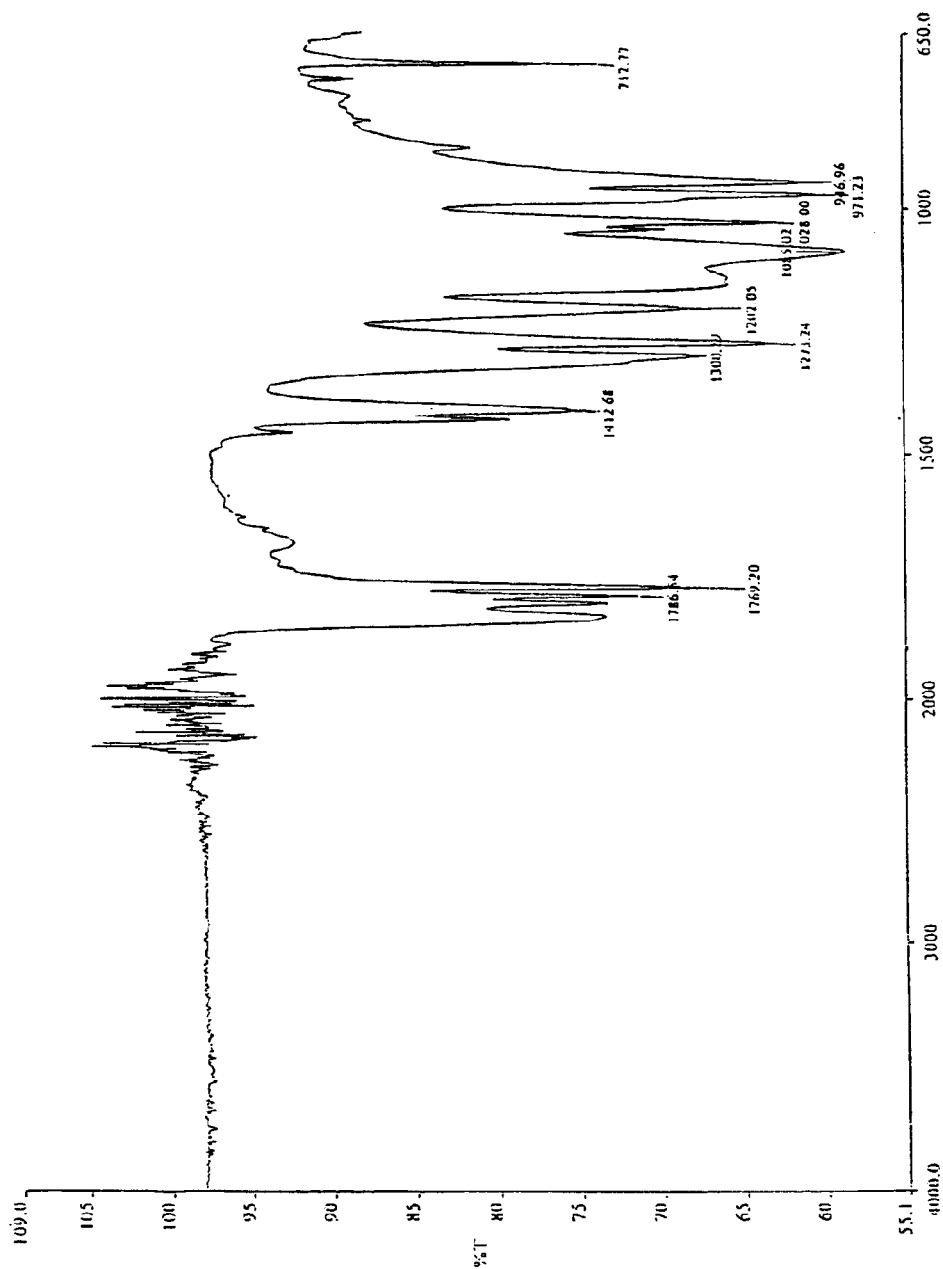
FIG. 5(b) is FTIR data for an exemplary Li salt.

Common Li salts, including LiPF$_6$, LiBOB, LiI and LiTFSi do not show absorption between 1630 and 1690 cm$^{-1}$. FIG. 5(b) shows an FTIR for LiBOB confirming the absence of infrared absorption between about 1630 and 1690 cm$^{-1}$.

Figure 5C:
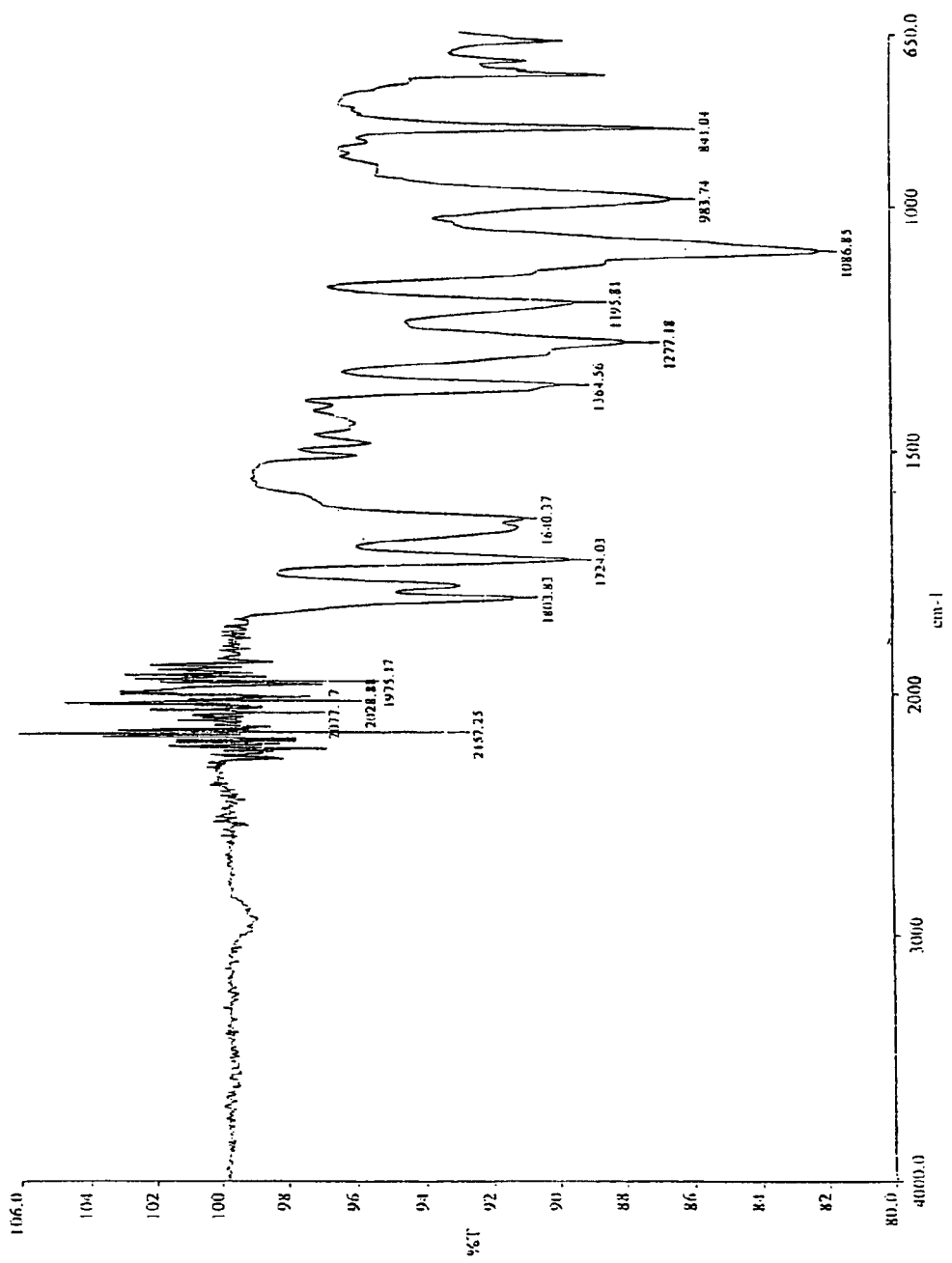
FIG. 5(c) is FTIR data for the exemplary polyimide whose FTIR data is shown in of FIG. 5(a) intermixed with and the exemplary Li salt whose FTIR data is shown in FIG. 5(b) evidencing the emergence of a doublet absorption peak at between about 1630 cm$^{-1}$ and 1690 cm$^{-1}$.

FIG. 5(c) shows the FTIR the polyimide shown in FIG. 1(c) combined with LiBOB. The resulting polyimide electrolyte shows a very strong doublet with a first peak at about 1672 cm$^{-1}$ and a second peak at 1640 cm$^{-1}$.

Thus, FTIR measurements taken from exemplary PMEs according to the invention provide evidence that the lithium salt forms a complex with the imide rings of the polyimide. This is likely one of the main reasons why the polyimide/lithium salt combination, in a dry film, has no apparent structure or crystallinity. The lack of crystallinity can be shown by a flat DCS trace. This evidence has also been found of an interaction between the lithium salt and the polyimide as the PME film is optically clear whether as a free standing film or as an overcoated film.

The card cell battery can be a primary or rechargeable battery. The battery can utilize a lithium ion or lithium metal anode. In the case of a rechargeable battery, contactless charging operations known in the art, such as using inductive coupling can be used to provide energy from an external power source to recharge the battery over the air provided appropriate reception devices are provided by the card cell.

In a preferred embodiment, a lithium metal battery having a PME is formed. In this embodiment, the anode can be formed from lithium metal or a lithium alloy. Lithium alloys can include lithium-aluminum, lithium-aluminum-silicon, lithium-aluminum-cadmium lithium-aluminum-bismuth, lithium-aluminum-tin or lithium-titanium oxide. The lithium content in these lithium alloys may be up to 99.98 wt. %. The overall lithium content in the anode is based on the required capacity of the battery.

The cathode material for the lithium metal battery can comprise an ionic conductive polymer binder, such as the polyimides described herein, an electronically conductive material (e.g. graphite), and an electrochemically active material. The electrochemically active material is preferably selected from MnO$_2$, the various lithium vanadium oxides (Li$_x$V$_y$O$_z$), lithium transition metal oxides, such as Li$_x$M-n$_y$O$_z$ (e.g. LiMn$_2$O$_4$), LiCoO$_2$, LiNiO$_2$, Li$_4$Ti$_5$O$_{12}$, LiV$_x$O$_y$, and other materials such as metal sulfides (e.g. TiS$_2$) and LiFePO$_4$. Similarly, cathodes and anodes in the case of Li ion batteries preferably include polyimides as binder matrices, such as those disclosed herein. For the Li ion or lithium metal battery, the anode, cathode and PME separator can all include the same or different polyimides.

Polyimides are generally prepared by reacting one or more diamines and one or more dianhydride monomers in a step-wise condensation reaction. Preferred diamines and dianhydrides are shown in FIG. 6.

The purity of the monomeric reactants has been found to be important. Aromatic diamines are known to be air sensitive. Thus, a purification process generally includes removing a portion of the oxidized diamine material. Following purification, aromatic diamines typically become white. However, absolutely pure diamines are difficult to achieve, and usually unnecessary. Recrystallization of the diamine from a mixture of alcohol and water has been found to be both effective and sufficient. The collected crystals are preferably dried under a vacuum because the water used for crystallization may not be easily removable at room temperature.

Dianhydrides are also preferably purified and can be purified using at least two methods. A preferred purification method is recrystallization from acetic anhydride. Acetic anhydride closes reactive anhydride rings. However, removal of acetic acid produced is sometimes difficult. Washing with ether or MTBE can be used to remove the residual acetic acid. The dianhydride crystals generally require drying in a vacuum oven. An alternate method is to quickly wash the crystals with dry ethanol to remove open anhydride rings and then to rapidly dry the washed powder in a vacuum oven. This method works for purifying BPDA if the incoming purity is at least approximately 96%.

The condensation reaction is performed to the poly (amic-acid) stage. One mole of diamine is reacted with about 1.005 to 1.01 equivalents of dianhydride. Excess dianhydride is generally preferably used to ensure that the dianhydride reagent determines the end group of the reaction product, the dianhydride excess ensuring that polymer chains are terminated with anhydride end groups which are known to maximize stability of the polymer product. In addition, such an excess compensates for traces of water which can react with anhydride groups.

The solution is preferably about 15 to 20 weight % total in NMP solvent. The diamine is usually dissolved first, preferably under nitrogen, although this is not required for all diamines. The dianhydride is then added. A large scale reaction preferably adds the dianhydride in portions because there is some heat of reaction and it is desirable to keep the temperature below 40° C. For example, a small scale reaction of 50 grams could add the dianhydride all at once, provided there is good initial mixing.

The dianhydride generally dissolves much more slowly than the diamine. For a small-scale reaction, the best and simplest way to perform the reaction is to use a cylindrical jar with a polytetrafluoroethylene sealed cap. This jar can be shaken by hand in the beginning and then put on a rolling mill at slow speed to turn the jar smoothly. The reaction proceeds best at room temperature over a two to twelve hour period. Once the initial reaction is complete, as evidenced by a substantially constant solution color and viscosity, the solution is ready for imide ring closure.

The chemical reaction to form the polyimide from the poly (amic-acid) can be performed with 1.1 equivalents of acetic anhydride per imide ring and 1 equivalent of pyridine as a ring closure catalyst. Pyridine can be added and rolling preferably continued until mixed. The acetic anhydride can cause a portion of the amic-acid polymer to precipitate.

The polymer should be redissolved before heating. One needs to carefully heat the jar to more than 80° C. but less than 90° C. It is best to use an oven and occasionally remove the jar to shake. Heating is performed for 60 minutes at full heat or until the color changes are complete. The jar is put on a rolling mill to cool while turning. Once the solution returns to room temperature, a fully imidized polymer dissolved in NMP results. However, the solution generally also has some residual pyridine, acetic acid, and may include some acetic anhydride. The solution is expected to be stable for reasonable periods of time.

A preferred method for collecting the product from a small-scale reaction is to precipitate the polymer into methyl alcohol. This removes the solvent load and traces of monomers that did not react. It also can be used, in conjunction with the observed viscosity, to estimate the quality of the polymerization. A good, high molecular weight polyimide will precipitate cleanly into methyl alcohol with little or no cloudiness. The viscosity should be high (e.g. 8000 to 10,000 cp).

The precipitated polymer is preferably washed two or more times until the smell of pyridine is slight. The polymer can then be air dried for a few hours in a hood and then dried in a vacuum oven at 125° C. overnight. The volume of methyl alcohol is preferably about a gallon per 100 grams of polymer.

On a larger scale, water can be used to remove solvents or trace materials. However, water is expected to be a less efficient than methyl alcohol for this purpose. A final soak with methyl alcohol is preferably added before drying if water is used with large quantities of polymer.

In another aspect of the invention which is preferably used to form the battery used in the card cell, a two piece battery assembly is disclosed. The two piece assembly comprises overcoating an electrode with a PME to form an electrode/separator and subsequent assembly with an anode.

In a conventional "gel" electrolyte technology a cathode slurry of electrochemically active material, conductive carbon and binder is mixed in a bulk solvent with the solvent functioning as a plasticizer for the binder material. The slurry is coated upon a current collector substrate and the bulk solvent removed. The anode is typically carbonaceous and made from a slurry of graphite, binder and plasticizing solvent. The bulk solvent is removed after coating on the current collector. The separator is coated as a free standing film from a slurry of non-ionically conductive polymer binder, inorganic support filler material and plasticizing solvent. The cathode, separator and anode are placed together and laminated under heat and pressure. The remaining plasticizer is then removed via an extraction process typically utilizing a hot solvent. The cell is removed and a liquid electrolyte is introduced into the system to fill the "pores" created via removal of the plasticizer. The cell is then packaged in a foil packaging material. Thus, conventional assembly processes comprise the joining of three separate components.

In contrast, in the two piece battery assembly a cathode slurry of active material, conductive carbon, polyimide binder and lithium salt is mixed in a bulk solvent. The slurry is coated upon a metal current collector substrate and the solvent is removed. Subsequently, the coated cathode is overcoated with a PME comprising a mixture of polyimide, lithium salt and bulk solvent, and then dried to remove solvent with an effective amount of solvent retained for conductivity purposes, such as 5 to 50 weight % versus polyimide plus salt. At this point the overcoated cathode has become both the cathode and the PME separator. An anode layer is then placed over the PME coated cathode, thus providing a battery assembly using only two components.

Figure 7:
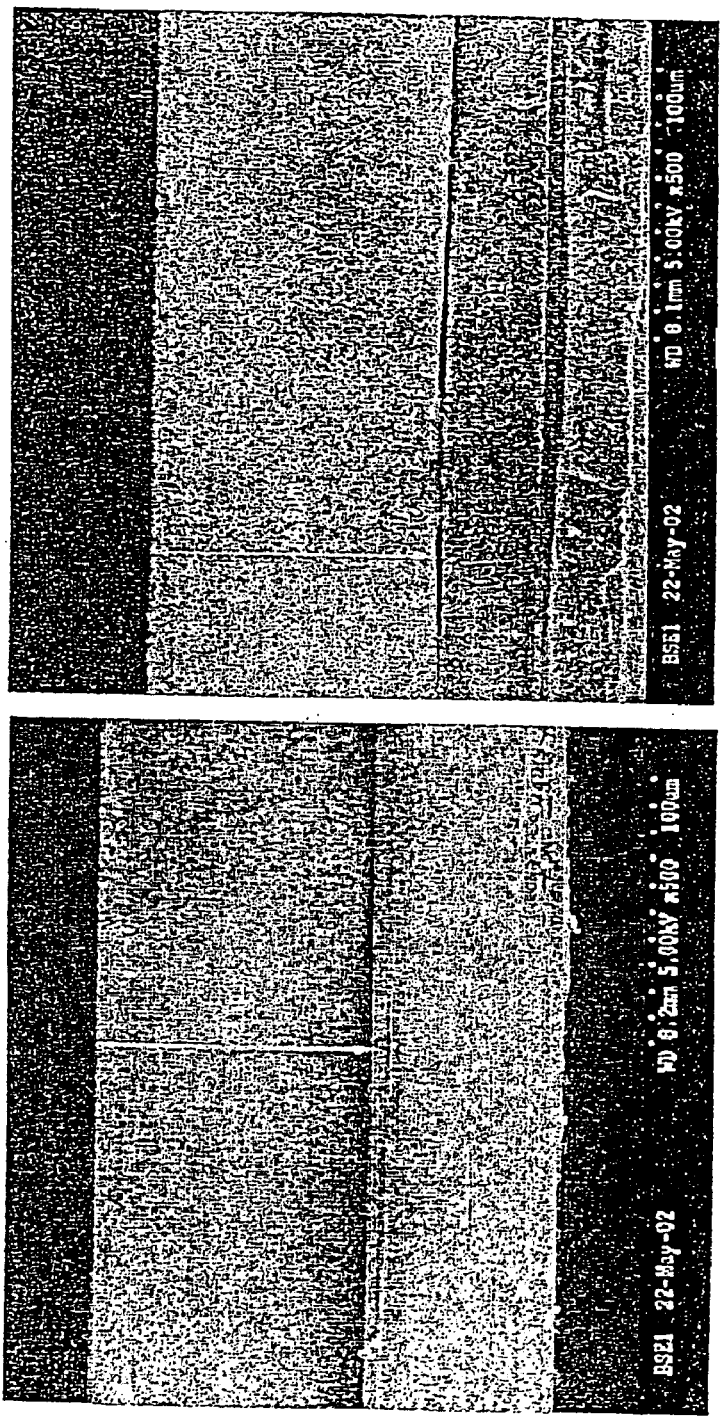
FIG. 7 shows an assembly process for forming an electrochemical bicell which is ready for packaging, according to an embodiment of the invention.

FIG. 7 shows a preferred assembly "folding" process related to the two component battery assembly process described above. A PME coated cathode on a cathode current collector is first provided as described above. Prior to placing the anode on the PME separator/cathode, in step 710 the surface of the PME overcoated cathode is sprayed with a small amount of solvent for adhesion purposes. In step 720 a Li anode, such as a Li metal strip having an area slightly less than the area of the PME coated cathode is then placed on the PME coated cathode. Alternatively, for a graphitic anode, the anode could also be coated, dried, then overcoated on the PME coated cathode. An anode tab, such as a nickel tab, is then placed on the anode in step 730. A cell fold is then performed in step 740 by wrapping the PME coated cathode over the lithium metal anode (or graphitic anode) as shown in FIG. 7. In step 750 a bicell battery 755 having an anode tab which is ready for packaging is produced. Bicells provide twice the capacity of conventional cells while having the same footprint of the conventional cell.

Figure 8:
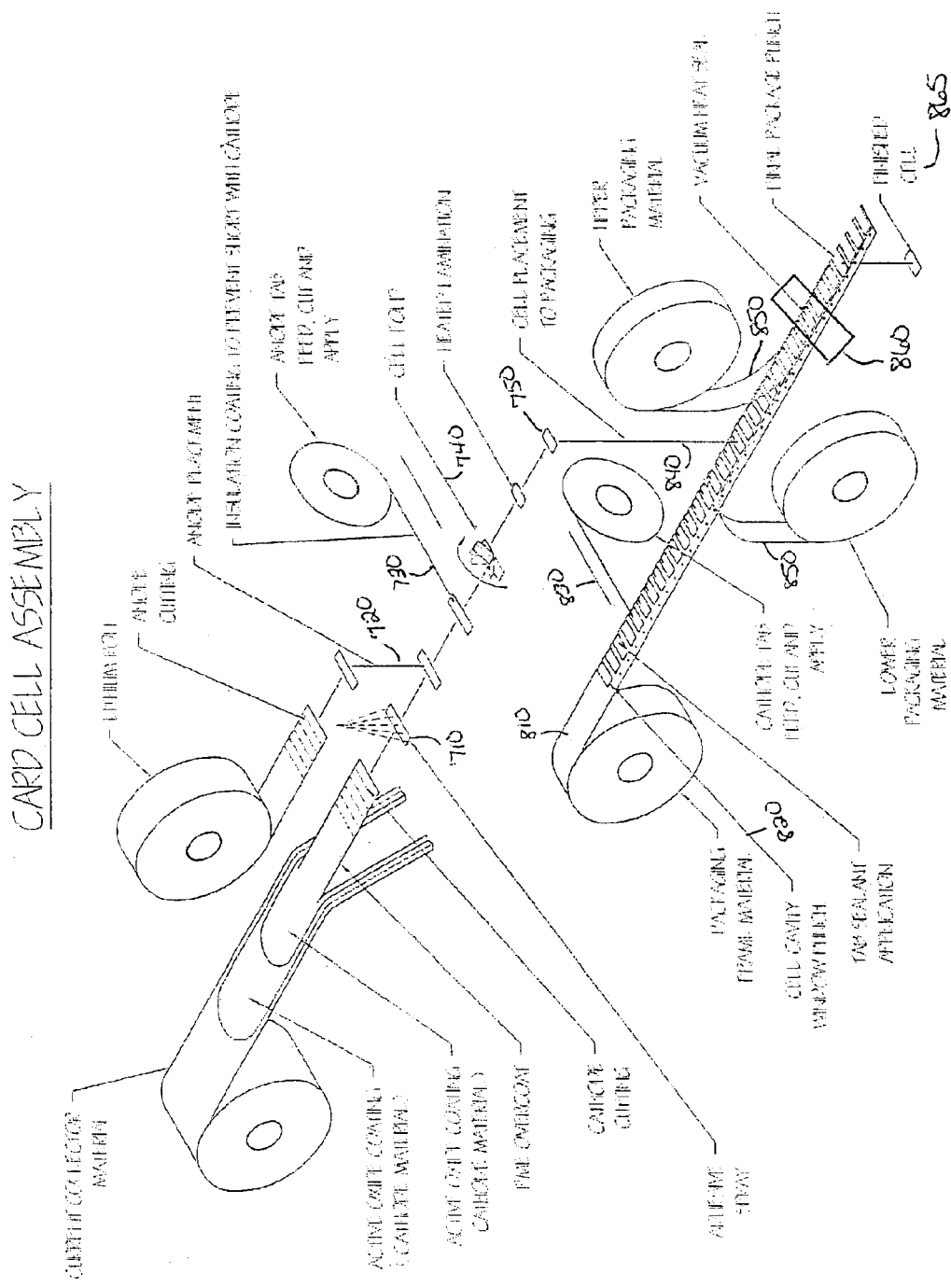
FIG. 8 shows an assembly process for packaging the electrochemical bicell produced by the assembly process shown in FIG. 7.

FIG. 8 shows an assembly process for packaging the electrochemical bicell 755 produced by the assembly process shown in FIG. 7, where the steps of the assembly process shown in FIG. 7 are repeated on the top of FIG. 8 for convenient reference. Although the process shown in FIG. 8 is applied to a bicell battery, the described process is in no way limited to bicells. For example, standard cells according to the invention can be packaged as shown in FIG. 8.

In step 810 packaging frame material is rolled out from a suitable roller, the frame material being a material such as PET, having a thickness substantially the same as the battery itself to fit around the battery. In step 820 an opening is created in the frame material which is slightly larger than the cell 755 to be inserted using a window punch or equivalent. A registration hole is also shown which can be created in step 820.

Tab sealant is applied to the package frame material or pre-applied to the tab strip. In step 830 a cathode tab is fed, cut and applied to the frame material. Lower packaging material having a low temperature heat sealant and moisture barrier is then applied to the frame. The interior heat sealant layer is a material that not only heat seals to itself, but also bonds strongly to the current collector of the battery, and preferably activates at between about 90 C to 100 C. The cell 755 is then preferably pick and placed into the cavity formed by the punched out package frame and onto the lower packaging material attached to the bottom of the frame in step 840. The lower packaging material is preferably heated (e.g. 90 C) prior to placing the cell 755 thereon to promote adhesion. Upper packaging material having a low temperature heat sealant and moisture barrier, which can be the same composition as lower packaging material, is then applied in step 850. Optionally, a binder material can be included on the outside of the lower and upper packaging material for applications such as the insertion of the packaged cell into a credit card.

Instead of using a perimeter seal used in a conventional step-down seal process, the entire surface of the battery along with the perimeter of the packaging material is heat laminated in step 860 to form a finished bicell battery 865 having substantially the same thickness dimension throughout. Although assembly of only a single bicell is shown, the assembly process shown in FIG. 8 can package one or more cells in a single package. A lamination temperature such as 110° C. for typically 5 to 15 seconds under a pressure sufficient to produce a uniform heat seal but not too high as to distort the battery and/or the package is used to provide the lamination to form the finished bicell battery 865. The substantially constant thickness of bicell 865 facilitates integration into a card, such as a credit card, and also reduces surface defects.

As used herein, "substantially the same thickness dimension throughout the battery" refers to a thickness over the entire area of the packaged battery being ±1 mil. A totally laminated battery with package 865 results which behaves as a single laminated layer.

Although not shown in FIG. 8, a step-down seal process which does not utilize a frame can be used. Instead, an elastomeric lamination plate set is used. This allows intimate contact of the packaging material all over the surface of the battery, the packaging material necking down to the side seal area where the packaging material laminates to itself.

Figure 9:
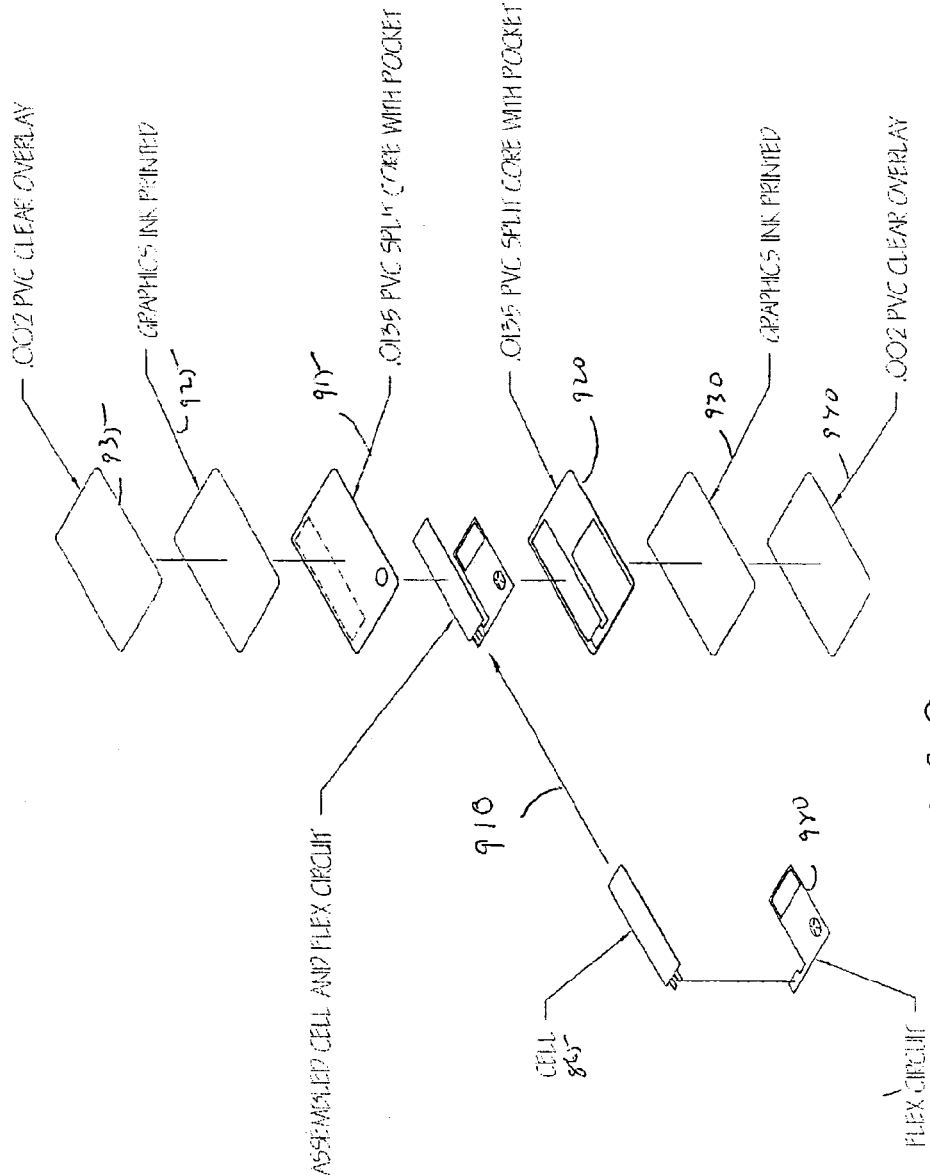
FIG. 9 shows an assembly process for embedding a packaged electrochemical bicell produced by the assembly process shown in FIG. 8 and an electronic flex circuit embedded inside a PVC card, according to an embodiment of the invention.

FIG. 9 shows an assembly process for embedding a packaged bicell 865 produced by the assembly process shown in FIG. 8 and an electronic flex circuit embedded inside a PVC card, according to an embodiment of the invention. For insertion of the finished packaged cell into a card, a binder adhesive is applied over the outer aluminum foil protectant layer, such as melamine or PET. However, if the upper and lower packaging material include a binder on their exterior as described above, this step is unnecessary. This "exterior" binder adhesive preferably maintains a higher temperature sealant activation than the interior heat seal layer described above, such as a 110 C to 140 C activation. The exterior binder is formulated to adhere well to both the outer battery package material and industry standard credit card PVC or other similar sheet material.

In the preferred embodiment as shown in FIG. 9, the bicell battery 865 and flex circuit 980 are then placed in step 910 between PVC split cores 915 and 920 which have suitable pockets provided for fitting bicell battery 865 and flex circuit 980. Bicell battery 865 can be connected to flex circuit 980 before or after placement of the same between PVC cores. Pockets in the PVC cores 915 and 920 are preferably milled, molded or formed to equal depth such that bicell 865 and flex circuit 980 extend the same distance into each PVC core. Attached to the side of the respective PVC cores 915 and 920 opposite to bicell battery 865 and flex circuit 980 are graphics print layers 925 and 930 each having a 2 mil PVC overlay layer 935, 940 to protect the ink.

The respective components and then subjected to a standard hot lamination process used in the credit card industry, such as a temperature of 125 C to 140C, at a pressure of 200 to 250 psi, for a dwell time of 5 to 15 minutes. The battery 855 and flex circuit 980 laminate to the interior of the PVC card and the PVC (or other card material) will laminate to itself to form a card cell article that behaves as a single article as it is bound together throughout via lamination. Generally, the finished card cell including the embedded battery 865 and flex cell 980 provides a thickness uniformity over the entire area of the card within a range of +1 ml. Thus, once cooled and processed into a finished card, the embedded battery is be practically invisible to a surface inspection of the card, and thus has a very minimal, if any, "witness mark".

The IC card device including battery according to the invention has been found to withstand rigorous ISO testing. Specifically, card cells according to the invention have demonstrated compliance with rigorous ISO testing criteria for bending, flex, and torsion according to ISO standards ISO/IEC 10373 and 14443 without inducing any detectable delamination. Moreover, following ISO testing, the bicell battery 865 and flex circuit 980 both remain invisible to the external of the card thus demonstrating no appearance failures of the card cell.

The high level of thermal stability provided by PMEs according to the invention permits batteries according to the invention to be laminated at the above-described harsh conditions and show a minimal change in operating characteristics, such as less than a 2% shift in OCV and a commensurate small change in capacity. Conventional batteries subjected to the above described card lamination conditions will generally either catastrophically fail or experience a large shift in operating parameters which would render them of no practical use.

Furthermore, once the card cell is flexed, the battery, package, and PVC all move together as they are bound together through lamination. As a result, flexing does not generate noticeable wrinkles, bumps, edge effects, or undulations in the surface of the card.

Several packaging new packaging aspects are described above. The battery package material is laminated to the entire battery. Previous lamination work disclosed only lamination to a portion of the battery. In addition, the invention describes the use of an exterior binder adhesive to laminate the battery to a card material, such as PVC. Previous bonding techniques used to embed batteries in cards have generally used a low temperature curable glue because of the inability of conventional batteries to withstand typical credit card lamination processing conditions. Use of a different activation temperature binders (higher temperature binder for the exterior of packaged cell as compared to the inside of packaged cell) for battery packaging and battery integration into the card allows processing of packaging material having binder on its exterior proceed thru the packaging lamination machinery to assemble the battery without causing the exterior binder material to contaminate the machinery and tooling, as well as preserve its integrity for the card lamination process. Finally, Installation of a frame to surround the cell permits production of substantially planar batteries which enhances integration into cards.

EXAMPLES

The present invention is further illustrated by the following specific examples. The examples are provided for illustration only and are not to be construed as limiting the scope or content of the invention in any way.

Example 1

Optical Clarity Measurements for Commercially Available polyimide/salt/solvent as Compared to Exemplary PMEs According to the Invention The purpose of this example is to demonstrate the homogenous nature of the PME formed from polyimides that have strong interactions with a lithium salt through demonstrated optical transmission. PME films were generated from polyimides shown in FIGS. 1(b), (c) and (m), while a Matrimid 5218p/salt/solvent was generated for comparison. The PMEs and Matrimid based film were cast upon a clear polyethylene terephthalate support film from NMP and dried for three hours in a vacuum oven at 120° C. The residual solvent content was approximately 4 wt %. All PME compositions and the Matrimid formulation were 32% polyimide, 64% LiTFSi salt, and the remainder being the small amount of solvent. All measurements were performed using 540 nm light.

| Polyimide Type | Film Thickness (mils) | Absorbance | % Transmission for a 1 mil film |
|---|---|---|---|
| Matrimid 5218 | 0.70 | 1.903 | 0.2% |
| FIG. 1(b) PI | 1.68 | 0.005 | 99.3% |
| FIG. 1(c) PI | 0.66 | 0.000 | 100% |
| FIG. 1(m) PI | 0.87 | 0.000 | 100% |

As demonstrated from the table above, the Matrimid polyimide does not form a clear homogenous composition when the lithium salt concentration is 64%. Moreover, the Matrimid polyimide does not form a clear homogenous composition even at substantially lower salt concentrations, such at a concentration of 0.5 moles of lithium salt per imide ring provided by the polyimide. Polyimides including a lithium salt in a concentration of 0.5 moles (or less) of lithium salt per imide ring provided by the polyimide generally lack sufficient minimum ionic conductivity to be a useful electrolyte separator for an electrochemical cell.

Although only data for polyimides shown in FIGS. 1(b), (c) and (m) are provided above, all polyimides shown in FIG. 1((a) through (m)) have been shown to form homogenous, clear films having optical properties as shown above for polyimides (b), (c) and (m). This PME property is desired for maximum film stability and ionic conductivity.

Example 2

Since the PME is a homogeneous or near homogeneous matrix material, batteries formed using the PME exhibit a unique ability to handle exposure to high temperatures and pressures, and still maintain its performance characteristics. Cell assembly is typically performed at elevated temperatures (e.g. 140° C.) and pressure (e.g. 125 psi) for about 10 minutes, so subsequent exposures to similar or less rigorous conditions do not effect cells manufactured according to the invention. Significantly, it has been found that cells according to the invention can withstand conditions significantly more rigorous as compared to the above-referenced cell assembly conditions.

Typical card manufacturing techniques require hot lamination at 125° C. for 5 or more minutes in an hydraulic press exerting over 250 psi. Batteries according to the invention have demonstrated full function following this process with no significant change in open circuit voltage (OCV) or capacity following typical lamination processing. In contrast, other battery technologies currently available will fail to operate (e.g. short) following conventional lamination processing or significantly lose capacity and/or OCV.

Batteries according to the invention can withstand conditions more rigorous than typical lamination processing. For example, a battery according to the invention was subjected to an injection molding process to see if the battery could withstand the conditions encountered during an injection molding process. Injection molding process were investigated for molding the polymers polyethylene-terephthalate (PET) and polyvinyl chloride (PVC) to encapsulate batteries according to the invention. The PET molding was performed at 295° C. and PVC at 200° C., with the mold pressure for both processes being 5000 psi. Both tests showed the batteries according to the invention including a PME, lithium metal anode and LVO comprising cathode endured the respective injection molding processes fully functional, with no significant change in capacity or OCV.

Example 3

Figure 10A:
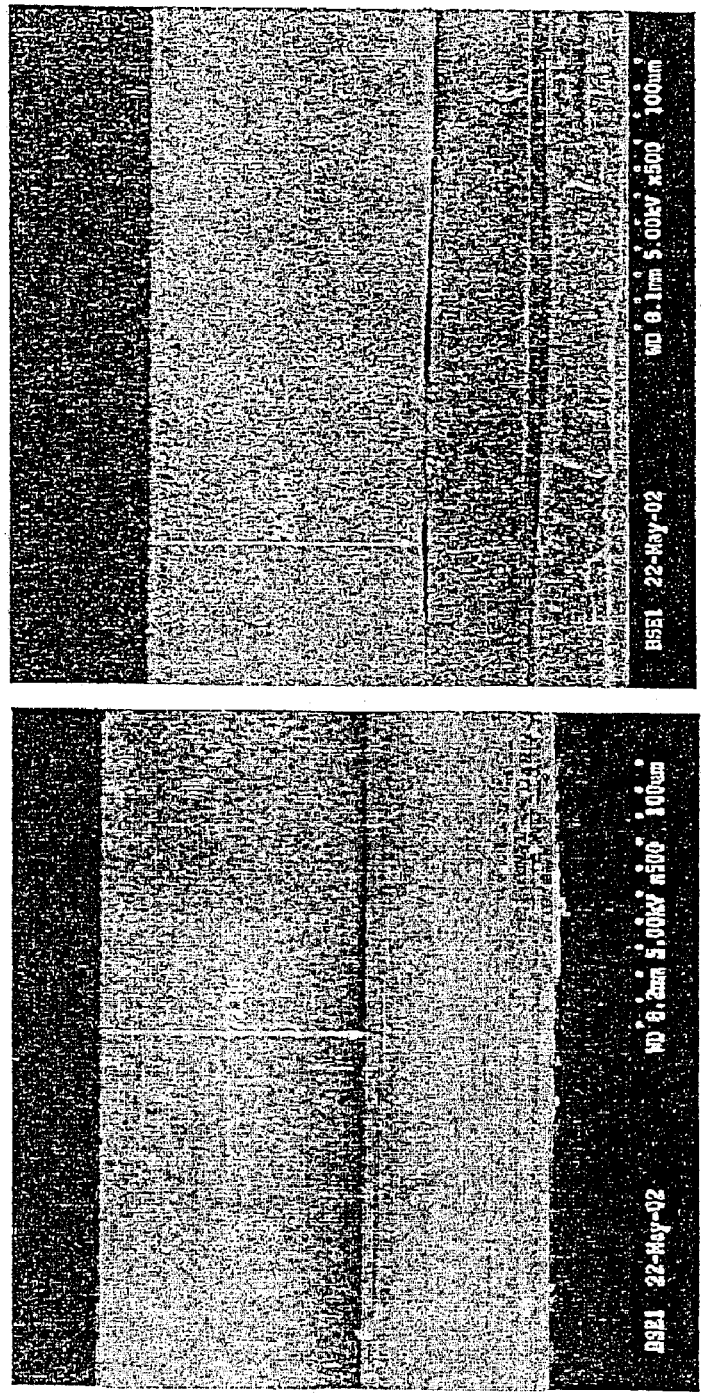
FIG. 10(a) is a SEM evidencing a defect free PME.

Scanning electron microscope (SEM) micrographs were taken to evaluate the morphology of the PME according to the invention and the interface between the PME and a lithium vanadium oxide (LVO)/polyimide cathode film. FIG. 10(a) shows two (2) SEM micrographs of the PME alone which each evidence a substantially defect free and a porosity free film. The thickness of the PME films shown were both about 75 μm.

Figure 10B:
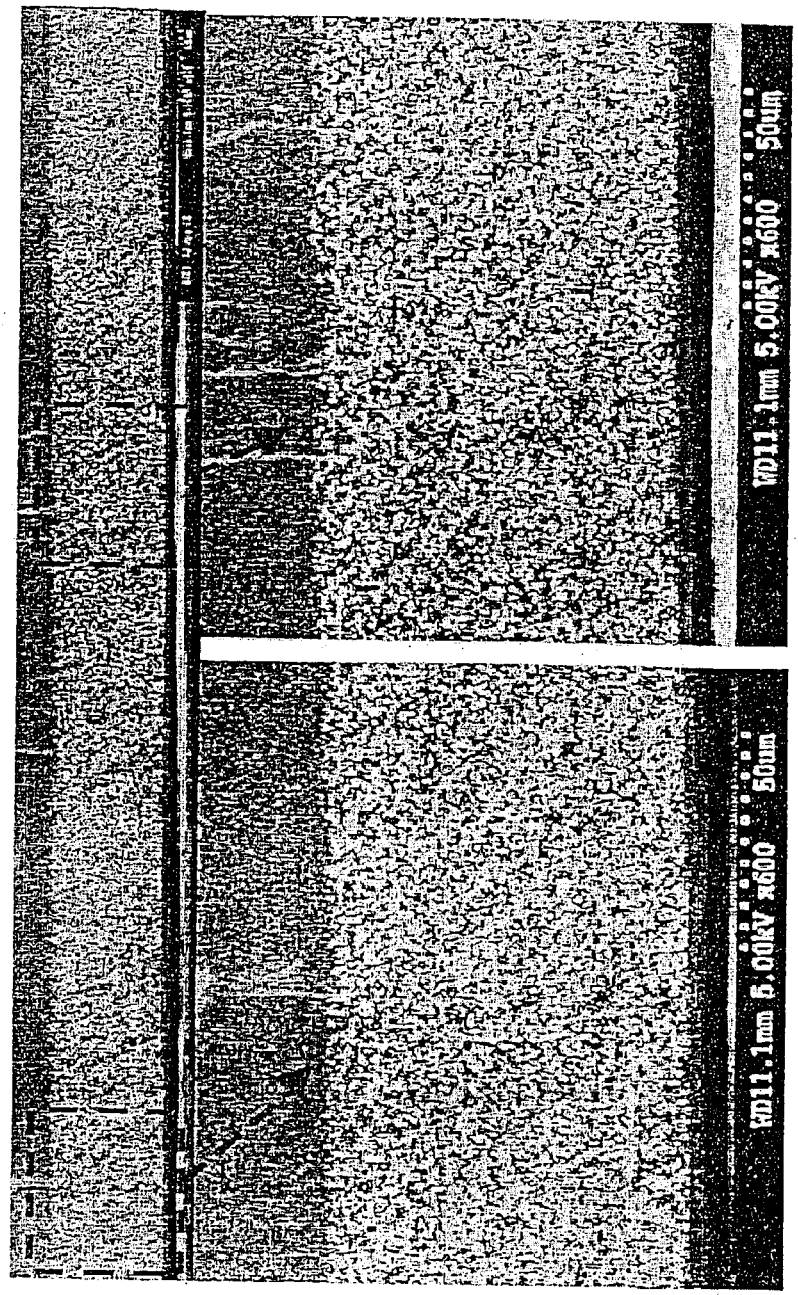
FIG. 10(b) is a SEM showing a smooth and uniform interface between a PME disposed on a lithium vanadium oxide (LVO) comprising cathode layer.

FIG. 10(b) shows a SEM of an interface between a PME film (20 μm) disposed on a lithium vanadium oxide/polyimide cathode layer (55 μm). The lower images are blowups of the interfaces shown at the top of FIG. 10(b). The interfaces shown are quite uniform and smooth.

Example 4

Figure 11:
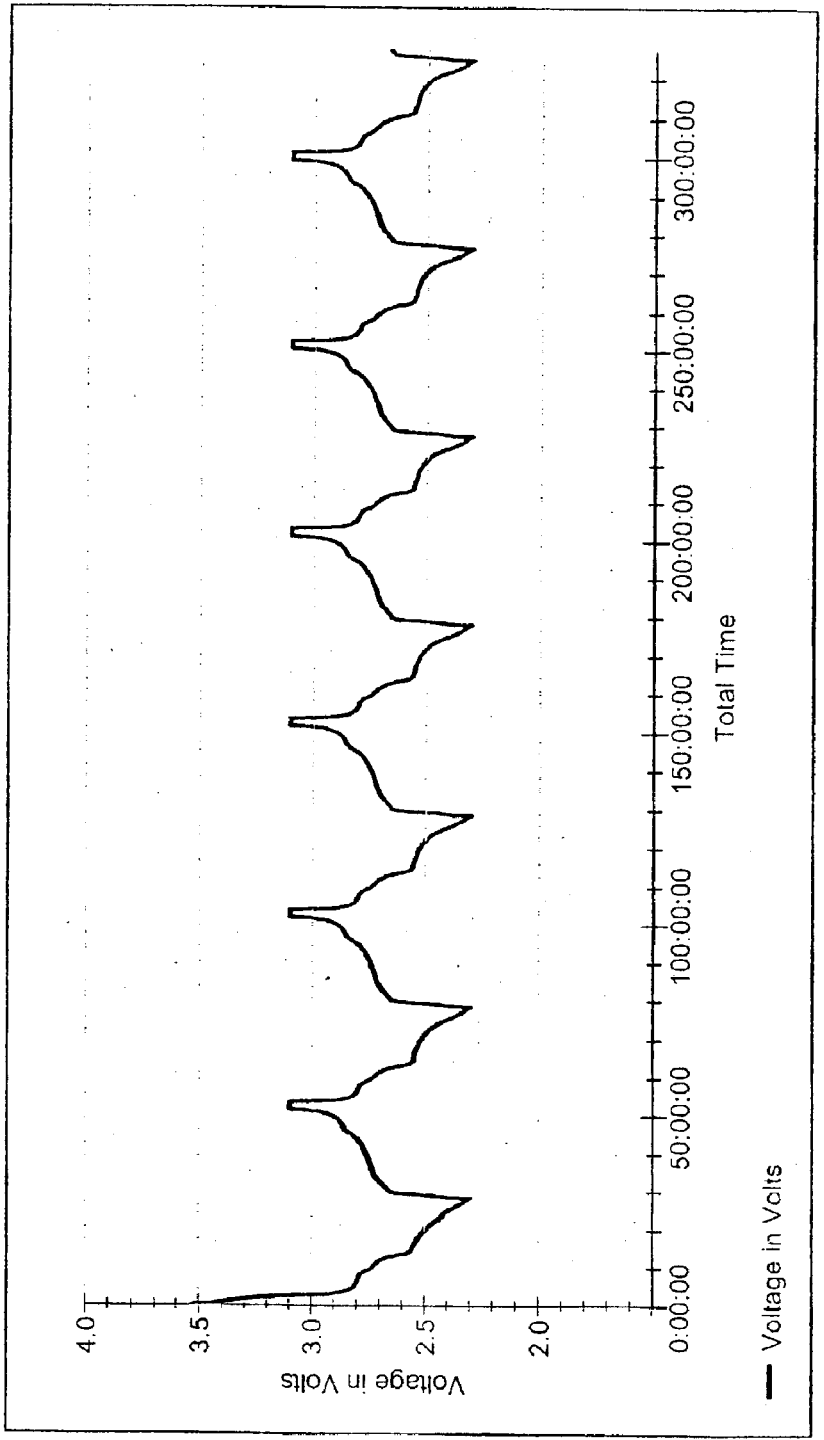
FIG. 11 shows the charge/discharge profile of a typical cell according to the invention, the cell including a lithium vanadium oxide cathode, a Li metal anode and a PME separator, according to an embodiment of the invention.
Figure 7:
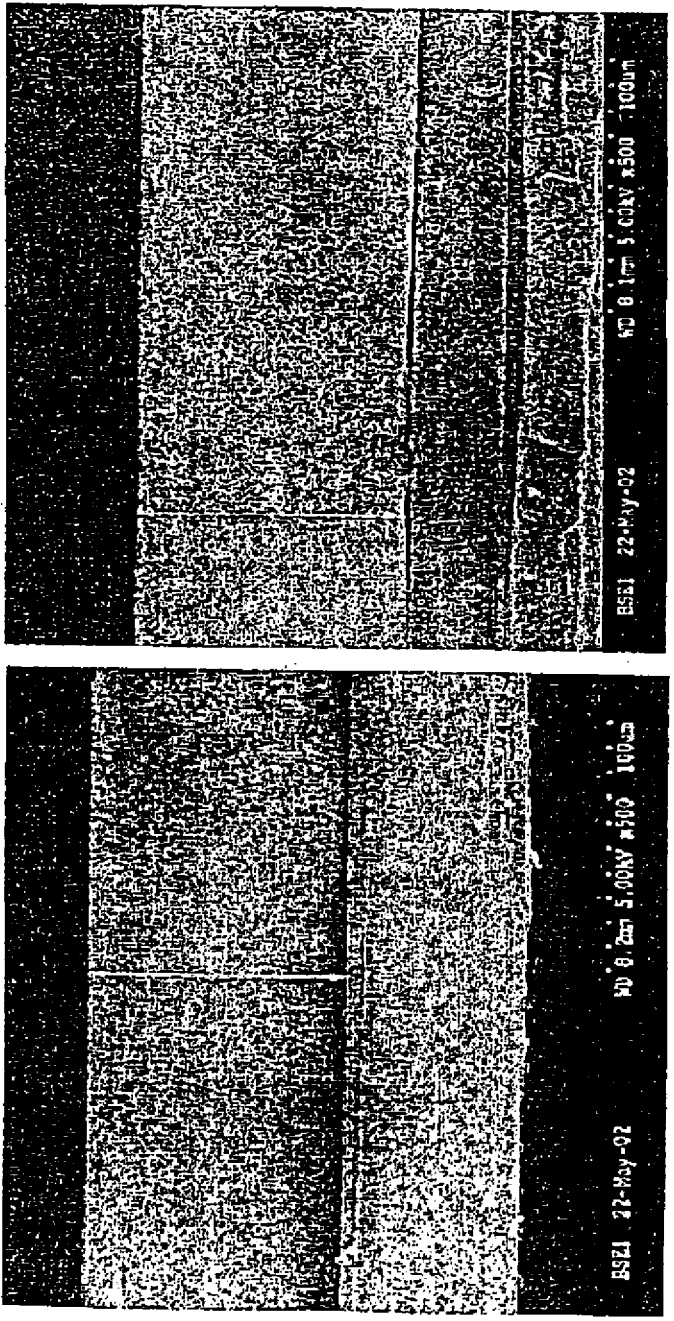

FIG. 11 shows the charge/discharge profile of a typical cell according to the invention, the cell including a lithium vanadium oxide (LVO) cathode, a Li metal anode and a PME separator, according to an embodiment of the invention. The cell capacity was 25 mAh. The y-axis represents cell voltage, while the x-axis represents total time. The cell demonstrates good cycling stability during a cycling of over 300 hours.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. An IC card, comprising:
   at least one plastic layer;
   a battery and at least one electronic comprising device embedded in said plastic layer, said battery electrically connected to said electronic comprising device for providing power for said electronic comprising device; said battery comprising:
   an anode;
   a cathode, and
   at least one polymer matrix electrolyte (PME) separator disposed between said anode and said cathode, said PME separator comprising a polyimide, at least one lithium salt and at least one solvent intermixed, said PME being substantially optically clear.

2. The IC card of claim 1, wherein said anode comprises lithium ion intercalation material.

3. The IC card of claim 1, wherein said anode comprises lithium metal.

4. The IC card of claim 1, wherein said anode comprises a lithium metal alloy anode.

5. The IC card of claim 1, wherein a repeat unit weight per imide ring of said polyimide is no more than 350.

6. The IC card of claim 1, wherein a repeat unit weight per imide ring of said polyimide is no more than 300.

7. The IC card of claim 1, wherein a repeat unit weight per imide ring of said polyimide is no more than 250.

8. The IC card of claim 1, wherein said polyimide is soluble at 25° C. in at least one solvent selected from the group consisting of N-methylpyrrolidinone (NMP), dimethylacetamide (DMAc) and dimethylformamide (DMF).

9. The IC card of claim 1, wherein the ionic conductivity of said PME at 25° C. is at least $1 \times 10^{-4}$ S/cm.

10. The IC card of claim 1, wherein the ionic conductivity of said PME at 25° C. is at least $3 \times 10^{-4}$ S/cm.

11. The IC card of claim 1, wherein said Li salt is at least one selected from the group consisting of LiCl, LiBr, LiI, $LiClO_4$, $LiBF_4$, $LiAsF_6$, $LiPF_6$, $LiCF_3SO_3$, LiBOB, $LiN(CF_3SO_2)_2$, and lithium bis(trifluorosulfonyl)imide (LiTFSI).

12. The IC card of claim 1, wherein said cathode comprises an ion conducting polymeric binder intermixed with an intercalation material.

13. The IC card of claim 12, wherein said polymeric binder comprises at least one polyimide.

14. The IC card of claim 1, wherein said battery provides an open circuit voltage and capacity shift of less than 10% following heating at 125° C. for at least 5 minutes while under a pressure of at least 250 psi.

15. The IC card of claim 1, wherein said battery provides an open circuit voltage and capacity shift of less than 5% following heating at 125° C. for at least 5 minutes while under a pressure of at least 250 psi.

16. The IC card of claim 1, wherein said battery is a primary battery.

17. The IC card of claim 1, wherein said battery is a secondary battery.

18. The IC card of claim 1, wherein said battery is a bicell.

19. The IC card of claim 1, wherein said lithium salt is in a concentration of at least 0.5 moles of lithium per mole of imide ring provided by said polyimide.

20. The IC card of claim 1, further comprising a package comprising packaging material surrounding said battery to form a packaged battery, said packaging material laminated by an exterior binder adhesive to all exterior surfaces of said battery.

21. The IC card of claim 1, further comprising a package including packaging material surrounding said battery and a frame having an opening to accommodate said battery therein to form a packaged battery, wherein said battery is disposed within said opening.

22. The IC card of claim 21, wherein said packaged battery provides a thickness uniformity throughout within ±1 mil.

23. The IC card of claim 22, further comprising an exterior binder adhesive disposed between said packaged battery and said plastic layer to bind said packaged battery to said plastic layer, wherein said exterior binder adhesive is activated at a temperature of at least 100 C.

24. The IC card of claim 23, wherein an interior binder adhesive seals said battery, wherein said interior binder adhesive has an activation temperature which is lower than an activation temperature of said exterior binder adhesive.

25. The IC card of claim 24, wherein said IC card provides a thickness uniformity throughout within ±1 mil.

26. The IC card of claim 1, wherein said IC card complies with ISO testing criteria for bending, flex, and torsion according to ISO standards ISO/IEC 10373 and 14443 without inducing any visually detectable delamination.

* * * * *

UNITED STATES PATENT AND TRADEMARK OFFICE
CERTIFICATE OF CORRECTION

PATENT NO.        : 6,936,377 B2
APPLICATION NO.   : 10/437546
DATED             : August 30, 2005
INVENTOR(S)       : Wensley et al.

It is certified that error appears in the above-identified patent and that said Letters Patent is hereby corrected as shown below:

Replace Figure 7 (drawing sheet 24 of 29) with the correct as-filed Figure 7.

Signed and Sealed this

Twenty-ninth Day of December, 2009

David J. Kappos
*Director of the United States Patent and Trademark Office*